US011611696B2

(12) United States Patent
Giordano et al.

(10) Patent No.: US 11,611,696 B2
(45) Date of Patent: Mar. 21, 2023

(54) SYSTEMS AND METHODS FOR OPERATING AN IMAGING DEVICE

(71) Applicant: Hand Held Products, Inc., Charlotte, NC (US)

(72) Inventors: Patrick Anthony Giordano, Glassboro, NJ (US); David M. Wilz, Sewell, NJ (US); Jeffrey Dean Harper, Bloomingburg, OH (US); Ka Man Au, Philadelphia, PA (US); Benjamin Hejl, Cherry Hill, NJ (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 17/645,327

(22) Filed: Dec. 21, 2021

(65) Prior Publication Data

US 2022/0116536 A1 Apr. 14, 2022

Related U.S. Application Data

(63) Continuation of application No. 16/892,824, filed on Jun. 4, 2020, now Pat. No. 11,245,845.

(51) Int. Cl.
*H04N 5/232* (2006.01)
*H04N 5/365* (2011.01)
*H04N 13/111* (2018.01)

(52) U.S. Cl.
CPC ..... *H04N 5/23229* (2013.01); *H04N 5/23254* (2013.01); *H04N 5/23225* (2013.01); *H04N 5/3653* (2013.01); *H04N 13/111* (2018.05)

(58) Field of Classification Search
CPC ........... H04N 5/23229; H04N 5/23254; H04N 5/23225; H04N 5/23238; H04N 13/111; H04N 5/3653; G06K 7/1417; G06K 7/10881; G06K 7/10762
See application file for complete search history.

(56) References Cited

U.S. PATENT DOCUMENTS

| 4,096,992 A | 6/1978 | Nojiri et al. |
| 5,659,360 A | 8/1997 | Mori et al. |
| 6,283,375 B1 | 9/2001 | Wilz et al. |

(Continued)

FOREIGN PATENT DOCUMENTS

| DE | 102016114745 | 2/2017 |
| EP | 3459436 A1 | 3/2019 |

(Continued)

OTHER PUBLICATIONS

Corrected Notice of Allowability (PTOL-37) received for U.S. Appl. No. 16/892,824, dated Dec. 7, 2021, 2 pages.

(Continued)

*Primary Examiner* — Hung H Lam
(74) *Attorney, Agent, or Firm* — Alston & Bird LLP

(57) ABSTRACT

The various embodiments illustrated herein disclose a method for operating an imaging device. the method includes activating a first image sensor at a first duty cycle within a first time period. The method further includes activating a second image sensor at a second duty cycle within the first time period. Additionally, the method includes modifying at least one of the first duty cycle or the second duty cycle based on at least a workflow associated an operator of the imaging device.

20 Claims, 17 Drawing Sheets

(56) References Cited

U.S. PATENT DOCUMENTS

| | | |
|---|---|---|
| 7,195,164 B2 | 3/2007 | Patel |
| 7,357,322 B2 | 4/2008 | Patel |
| 8,711,238 B2* | 4/2014 | Crook .................. H04N 13/239 |
| | | 348/211.3 |
| 8,913,138 B2 | 12/2014 | Hamel |
| 9,646,188 B1 | 5/2017 | Kuchenbrod et al. |
| 2003/0048363 A1* | 3/2003 | Watanabe ............ H04N 5/2355 |
| | | 348/222.1 |
| 2004/0134989 A1 | 7/2004 | Meier et al. |
| 2011/0043669 A1 | 2/2011 | Ishida |
| 2012/0262553 A1 | 10/2012 | Chen et al. |
| 2014/0021956 A1 | 1/2014 | Tomiha et al. |
| 2014/0034734 A1 | 2/2014 | Sauerwein |
| 2016/0259811 A1* | 9/2016 | MacKay ............. H04L 67/1097 |
| 2017/0230650 A1 | 8/2017 | Baker |
| 2018/0150062 A1 | 5/2018 | Shapiro |
| 2020/0049825 A1 | 2/2020 | Wang |
| 2020/0401524 A1* | 12/2020 | Sundaram ............. G06F 9/3824 |

FOREIGN PATENT DOCUMENTS

| | | |
|---|---|---|
| WO | 2018/092026 A1 | 5/2018 |
| WO | 2018/169608 A1 | 9/2018 |

OTHER PUBLICATIONS

Extended European Search Report issued in European Application No. 21175471.8 dated Oct. 19, 2021, 7 pages.

Notice of Allowance received for U.S. Appl. No. 16/892,824, dated Sep. 27, 2021, 11 pages.

* cited by examiner

SYSTEMS AND METHODS FOR OPERATING AN IMAGING DEVICE

CROSS-REFERENCE TO RELATED APPLICATIONS

This application is a continuation of U.S. patent application Ser. No. 16/892,824, filed Jun. 4, 2020, titled "Systems And Methods for Operating An Imaging Device," the contents of each of which is incorporated by reference herein in their entirety.

TECHNICAL FIELD

Example embodiments of the present disclosure relate generally to an imaging device and, more particularly, to systems, apparatuses, computer program product and methods for operating the imaging device.

BACKGROUND

Imaging device, for example used for barcode scanners, may include one or more image sensors that may be utilized to capture images of the field of view of the one or more image sensors. Each of the one or more image sensors may have respective operating range and capabilities. For example, a first image sensor may be configured to operate in a short distance range, while the second image sensor may be configured to operate in a longer distance range than the first image sensor. Applicant has identified problems with conventional implementations for utilizing multiple image sensors efficiently and accurately.

BRIEF SUMMARY

The various embodiments illustrated herein disclose an imaging device that includes a first image sensor. The imaging device also includes a second image sensor; and a processor communicatively coupled to the first image sensor and the second image sensor. The processor is configured to control the first image sensor, for example in at least one example embodiment the processor is configured to activate the first image sensor at a first duty cycle within a first time period. The processor is further configured to control the second image sensor, for example in at least one example embodiment the processor is configured to activate the second image sensor at a second duty cycle within the first time period. Additionally, in at least some example embodiments, the processor is further configured to modify at least one of the first duty cycle or the second duty cycle based on at least a workflow associated an operator of the imaging device.

The various embodiments illustrated herein disclose a method for operating an imaging device. the method includes activating a first image sensor at a first duty cycle within a first time period. The method further includes activating a second image sensor at a second duty cycle within the first time period. Additionally, the method includes modifying at least one of the first duty cycle or the second duty cycle based on at least a workflow associated an operator of the imaging device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
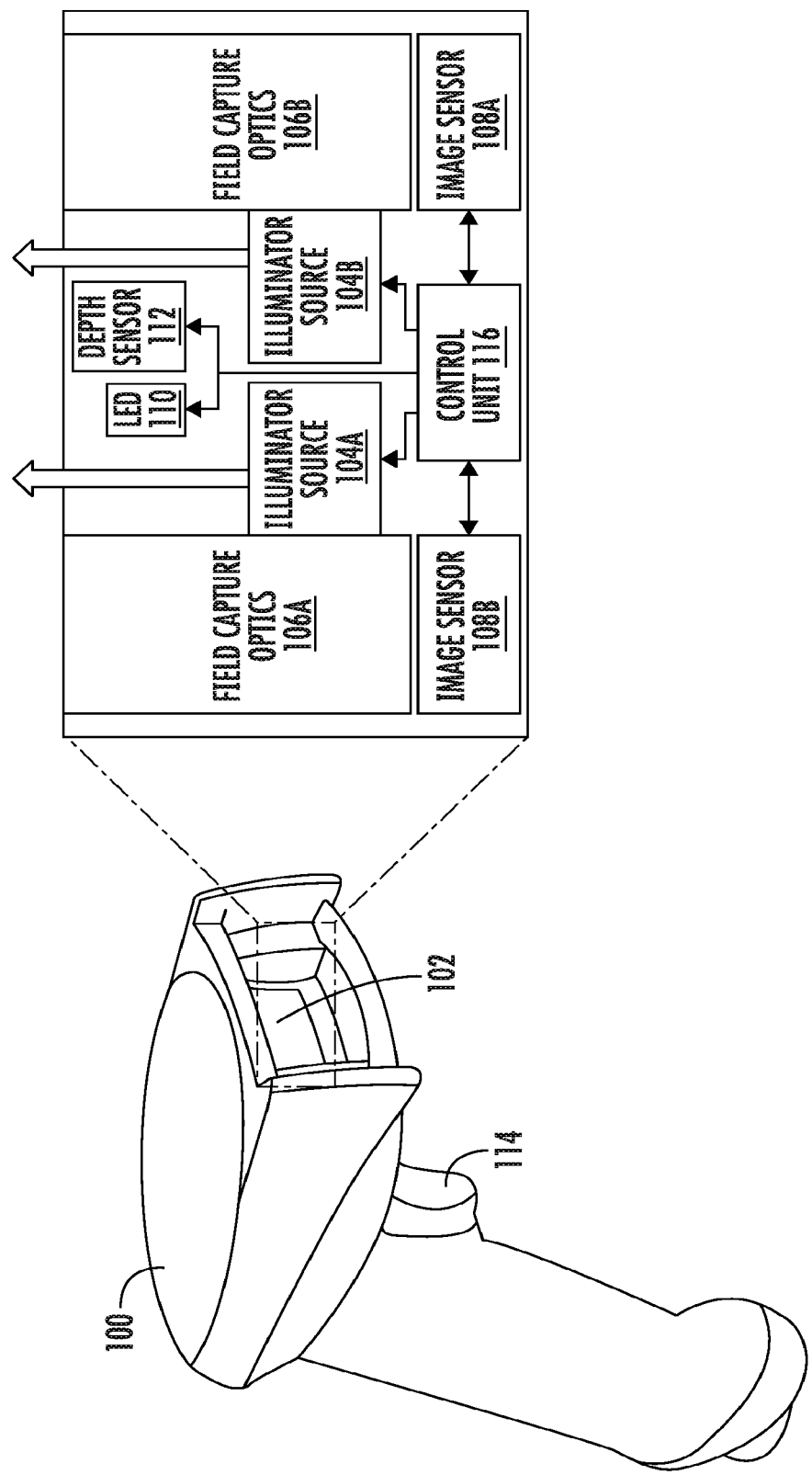
FIG. 1 illustrates an imaging device, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The terms "example" or "exemplary" are used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "electronically coupled," "electronically coupling," "electronically couple," "in communication with," "in electronic communication with," or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

The term "processor" refers to computing hardware, firmware, and/or software for performing one or more instructions representing computer-implemented actions. In some embodiments, a processor includes one or more memory components for storing instructions and/or data objects for manipulation. Additionally or alternatively, in some embodiments, a processor is configured to communicate with one or more memory devices for retrieving instructions and/or storing and retrieving data objects for manipulation. Non-limiting examples of processors include specially configured processing circuitry, a microprocessor, a central processing unit ("CPU"), a digital signal processor ("DSP"), and/or a combination thereof. The term "controller" refers to a specialized processor for communicating with, and/or transmitting one or more signals for controlling, one or more components, devices, and/or other computing hardware.

The term "image sensor" refers to computing hardware for capturing image data embodied by an image data object. An exemplary image sensor converts light and/or other electromagnetic energy reflected off a target and/or field, and provides an output signal representative thereof. In some such embodiments, the output signal is embodied by the image data object outputted by the image sensor. At least one example image sensor includes an array of pixels adapted to operate in a global shutter, or full frame shutter, mode or alternatively operate in a rolling shutter mode. In some embodiments, an image sensor is a color or monochrome 2D solid state image sensor implemented in any of CCD, CMOS, NMOS, PMOS, CID CMD, and/or back-illuminated technologies. In some embodiments, the image sensor may be either a progressive or interleaved imager. In at least some embodiments, the image sensor may contain an array of light sensitive photodiodes (or pixels) that convert incident light energy into electric charge. Many solid state image sensors also allow regions of a full frame of image data to be addressed. In at least one example embodiment, an exemplary image sensor uses a monocolor image sensor that may include a filter element defining color sensitive pixel elements dispersed throughout an array of monochrome pixels. Operation of the monocolor image sensor is to subsample color images (monochrome or full color) utilizing associated optimal sensor settings for image capture or symbology scanning.

An image sensor is configured for capturing image data based on a particular image size, for example represented by the pixel count associated with the image sensor. Additionally, in some embodiments, the term "image sensor" additionally refers to supporting circuitry/hardware, firmware, and/or software for configuring the data captured and/or output by the image sensor. For example, the term "image sensor" may additionally refer to supporting circuitry for generating a middle frame image data object from a captured full frame image data object, and/or subsequently outputting the middle frame image data object. Non-limiting examples of image sensors include a global shutter monochrome sensor (1920×1200 resolution, 3 um pixel) and a global shutter monochrome sensor (1280×800 resolution, 3 um pixel).

The term "image processing operation" refers to one or more actions defining an algorithm for identifying data, generating data, decoding data, or otherwise identifying data representing a desired result based on processing of one or more images captured via one or a plurality of image sensors. In some embodiments, an image processing operation includes one or more "image processing operation stages" or "stages," which refers to sub-steps for completing a corresponding image processing operation. Non-limiting examples of an image processing operation include decoding machine-readable symbology (e.g., a barcode, QR code, or the like) provided within the target or captured image(s), dimensioning an object within the target or captured image(s), and identifying features of a captured image.

The term "workflow" refers to series of one or more tasks to be performed sequentially or non-sequentially in a work environment. Nonlimiting examples of a workflow include an item picking workflow, an item placing workflow, and/or the like. In some examples, the item picking workflow may correspond to an order fulfillment request in which a operator may have to traverse in the work environment and pick various items for the order fulfillment request. Similarly, the item placing workflow may correspond to an item replenishment request in which various items are to be placed at various locations in the work environment, for example, to restock the items in the work environment. The scope of the disclosure is not limited to the aforementioned examples of workflows. Other workflows may be envisioned without departing from the scope of the disclosure.

The term "metadata associated with task" in some example embodiments refers to information associated with the task that may be required to execute the task. Some examples of the metadata associated with the task include, but are not limited to, a location at which the task is to be performed, a type of the task, a type of an image sensor in an imaging device that is to be used to capture an image, and/or the like.

The term "manifest of workflow" in at least some example embodiments refers to to an index that lists the one or more tasks included in the workflow and/or the metadata associated with each of the one or more tasks. Additionally or alternatively, in at least some example embodiments, the manifest of the workflow defines a sequence in which the one or more tasks are to be performed.

The term "duty cycle" refers to a percentage of a time period for which an electronic component (such as an image sensor) is activated. For example, in at least one example context, in a circumstance where the duty cycle associated with an image sensor is 50%, the image sensor is exposed for 50% of the time period and is unexposed for remaining 50% of the time period.

An imaging device may include multiple image sensors (e.g., two image sensor) that may each be configured to capture images of their respective field of view. For optimal operation of the imaging device, it may be required to determine which image sensor of the multiple imaging sensors is to be used.

According to embodiments disclosed herein methods, apparatuses, computer program products, and systems for operating an imaging device are disclosed. The imaging device may include at least a processor, and an imaging engine. The imaging engine may further include a first image sensor, and a second image sensor. In an example embodiment, the first image sensor may be different from the second image sensor. For example, one or more parameters associated with the first image sensor may be different from the one or more parameters associated with the second image sensor. In an example embodiment, the one or more parameters associated with an image sensor (e.g., the first image sensor or the second image sensor) may include a type of field of view associated with the image sensor, a resolution of the image sensor, and/or the like. In some examples, the field of view of the first image sensor and the second image sensor may be deterministic based on respective optical assemblies associated with the first image sensor and the second image sensor. For example, the optical assembly associated with the first image sensor may cause the first image sensor to have a narrower field of view (hereinafter referred to as a narrow field of view) in comparison to the field of view of the second image sensor. Therefore, the optical assembly associated with the second image sensor may cause the second image sensor to have a broader field of view (hereinafter referred to as broad field of view) in comparison to the field of view of the first image sensor. In an example embodiment, the narrow field of view and the broad field of view may correspond to an angle through which the second image sensor and the first image sensor may receive the light. In an example embodiment, the narrow field of view has a smaller angle in comparison to the broad field of view.

In an example embodiment, the narrow field of view of the first image sensor enables the first image sensor to have a first operating distance range. Similarly, the broad field of view of the second image sensor enables the second image sensor to have a second operating distance range. In an example embodiment, the first operating distance range associated with the first image sensor may correspond to a distance range within which the first image sensor may capture a focused image. In an example embodiment, the second operating distance range associated with the second image sensor may correspond to a distance range within which the second image sensor may capture a focused image. In some examples, because the first image sensor has a narrow field of view, the first operating distance range of the first image sensor is greater than the second operating distance range of the second image sensor.

In an example embodiment, the processor may be configured to switch between the first image sensor and the second image sensor based on a scenario in which the imaging device is being used. In an example embodiment, the switching between the first image sensor and the second image sensor may be deterministically equitable according to modifying the duty cycle of the first image sensor and the second image sensor. For example, initially, the processor may be configured to operate the first image sensor at a first duty cycle within a first time period. Further, the processor may be configured to operate the second image sensor at the second duty cycle within the first time period. In some examples, the processor may modify the first duty cycle and the second duty cycle to switch between the first image sensor and the second image sensor. For example, the processor may increase the first duty cycle (the amount of time the processor operates the first image sensor) that may cause the first image sensor to operate for a longer duration of the time in comparison the second image sensor.

In an example embodiment, the processor may be configured to modify the first duty cycle and the second duty cycle based on a workflow associated with an operator of the imaging engine. For instance, the processor may be configured to modify the first duty cycle and the second duty cycle based on metadata associated with a task (listed in the manifest of the workflow). For example, the processor may determine that the second image sensor is to be used to execute the task (determined from the metadata associated with the task). Accordingly, the processor may be configured to increase the second duty cycle (the amount of time the processor operates the second image sensor), while reduce the first duty cycle (the amount of time the processor operate the first image sensor).

Additionally or alternatively, the imaging device may be utilized to execute an ad-hoc task that may not have associated metadata. To this end, during execution of the task, the processor may be configured to operate the first image sensor and the second image sensor (at the first duty cycle and the second duty cycle, respectively) to obtain a first set of images and a second set of images, respectively. Thereafter, the processor may determine a first quality score for a first image in the first set of images. Additionally, the processor may be configured to determine a second quality score for a second image in the second set of images. Further, the processor may be configured to compare the first quality score with the second quality score to determine which of the first image or the second image has a better quality. If the processor determines that the first quality score is greater than the second quality score, the processor may determine that the first image has a better quality than the second image. Accordingly, the processor may increase the first duty cycle (the amount of time the processor operates the first image sensor) and may reduce the second duty cycle (the amount of time the processor operates the second image sensor). However, if the processor determines that the first quality score is less than the second quality score, the processor may determine that the second image has a better quality than the first image. Accordingly, the processor may decrease the first duty cycle (the amount of time the processor operates the first image sensor) and may increase the second duty cycle (the amount of time the processor operates the second image sensor).

Additionally or alternatively, during execution of the task, the processor may be configured to activate an aimer LED, while the processor operates the first image sensor and the second image sensor at the first duty cycle and the second duty cycle, respectively. Accordingly, the first set of images (captured by the first image sensor) and the second set of images (captured by the second image sensor) may include the image of a reflected aimer light (reflected from a surface of an object being scanned). In some examples, thereafter, the processor may be configured to determine an operating distance of the imaging device from the object based on a first position of the reflected aimer light in the first set of images and a second position of the reflected aimer light in the second set of images. The processor may utilize a known parallax method to determine the operating distance based on the first position of the reflected aimer light in the first set of images and the second position of the reflected aimer light in the second set of images. Subsequently, in some examples, the processor may be configured to compare the operating distance with the first operating distance range associated with the first image sensor and the second operating distance range associated with the second image sensor. If the processor determines that the operating distance of the imaging device is in the first operating distance range, the processor may be configured to increase the first duty cycle. Similarly, if the processor determines that the operating distance of the imaging device is in the second operating distance range, the processor may be configured to increase the second duty cycle. In some examples, the scope of the disclosure is not limited to determining the operating distance by utilizing the aimer LED and the parallax method. In an alternative embodiment, the processor may utilize a depth sensor to determine the operating distance. In yet other embodiments, the processor utilizes other known hardware, software, and/or firmware implementations to determine the operating distance.

In yet another embodiment, the processor may be configured to estimate the operating distance based on an orientation of the imaging device. In an example embodiment, the processor may utilize one or more inertial sensors such as gyroscope and accelerometer to determine the orientation of the imaging device. To this end, the processor may determine that the operating distance of the imaging engine is the first operating distance range in a circumstance where the processor determines, for example based on the determined orientation of the imaging device, that the imaging device is tilted towards a ceiling of the work environment. Further, the processor may determine that the operating distance of the imaging engine is the second operating distance range in a circumstance where the processor determines, for example based on the determined orientation of the imaging device, that the imaging engine is tilted towards a ground or floor of the work environment. Accordingly, the processor may be configured to modify the first duty cycle and the second duty cycle based on the determined operating distance. In an example embodiment, such determination of the operating distance of the imaging device is based on predetermined knowledge and/or a hypothesis with respect to operation of the imaging device, for example that usually the imaging device is pointed towards the ground if the operator is scanning an object held in his/her hands. Accordingly, the operating distance of the imaging device from the object may be within the second operating distance range. Further, the hypothesis may include that usually the imaging device is pointed towards the ceiling if the operator is scanning an object at a distance that is within the first operating distance range.

Additionally or alternatively, the processor may be configured to modify the first duty cycle and the second duty cycle based on historical data. In an example embodiment, the historical data may include information pertaining to the metadata associated with each of the previous tasks performed by the operator using the imaging device along with a final value of the first duty cycle and the second duty cycle at which the task was successfully executed. Additionally or alternatively, the historical data may include a count of times the first duty cycle (the amount of time the processor operates the first image sensor) was increased, and/or otherwise altered, and a count of times the second duty cycle (the amount of time the processor operates the second image sensor) was increased, and/or otherwise altered.

In an example embodiment, the processor may be configured to compare the metadata associated with a current task being performed by the operator and the historical data to determine the values of the first duty cycle and the second duty cycle at which the first image sensor and the second image sensor are to be operated.

Accordingly, switching between the first image sensor and the second image sensor based on the aforementioned scenarios enables the processor of the imaging device to select optimal image sensor efficiently. Further, maintaining the historical data and selecting image sensor based on the historical data may further allow to accelerate the selection of the image sensor, improving the overall snappiness of the imaging device.

FIG. 1 illustrates an imaging device 100, according to one or more embodiments described herein. The imaging device 100 includes an imaging engine 102 that further includes an illuminator sources 104A and 104B (collectively "illuminator sources 104"), the field capture optics 106A and 106B (collectively "field capture optics 106"), the first image sensor 108A and the second image sensor 108B, an aimer LED 110, and/or optionally a depth sensor 112. The imaging device 100 further includes a trigger button 114, and a control unit 116. It should be appreciated that, in other embodiments, the imaging engine 102 may include any number of image sensors and/or illuminator sources (e.g., a tri-sensor and/or tri-illuminator source apparatus, a quad-sensor and/or quad-illuminator source apparatus, and/or the like). In yet other embodiments, the imaging engine 102 includes any number of image sensors and/or illuminator sources such as a single image sensor with a single illuminator source.

Each of the illuminator sources 104 may be embodied by any of a number of light generation components. In some embodiments, the illuminator source 104A is embodied by one or more light emitting diodes ("LED"), laser emitting diodes, and/or the like. Additionally or alternatively, in some embodiments, the illuminator sources 104B is similarly embodied by any number of light generation components. For example, in some embodiments, the illuminator source 104B is embodied by one or more LEDs, laser emitting diodes, and/or the like. In some embodiments, each of the illuminator sources 104 is associated with pattern projection optics for producing a particular illumination pattern based on the produced light. In this regard, the pattern projection optics associated with the illuminator source 104A may be configured to produce a first illumination projection having a first illumination pattern, and the pattern projection optics associated with the illuminator source 104B may be configured to produce a second illumination projection having a second illumination pattern. It should be appreciated that one or more parameters of the illuminator sources 104 (e.g., intensity, aperture, or the like) as well as one or more parameters of corresponding pattern projection optics (e.g., a lens angle or other design, lens material, or the like) may influence the illumination projection produced by each of the illuminator source 104. In this regard, one of the illuminator sources 104 may produce an illumination pattern that covers a broader field, in at least one direction, than the other illuminator source. The illuminator source that projects the broadest illumination pattern may be referred to as the broadest illuminator source.

Each of the illuminator sources 104 may be associated with a corresponding image sensor and corresponding field capture optics. In some embodiments, the illuminator source 104A is associated with the field capture optics 106A and the first image sensor 108A located nearest the illuminator source 104A. In other embodiments, the illuminator source 104A is associated with the field capture optics 106B and the second image sensor 108B located further from the corresponding illumination source. As illustrated, for example, the illuminator source 104A may be associated with the field capture optics 106B and the second image sensor 108B, such as in a circumstance where the illuminator source 104A is a near-field illuminator source that may cause light reflection that affects operation of the second image sensor 108B if positioned adjacent.

The field capture optics 106 may each include one or more lenses, and/or subassemblies thereof, configured to enable the corresponding image sensors 108 to capture a particular field of view. In this regard, each of the field capture optics 106 may be associated with a different focal length, field of view, and/or the like. Additionally or alternatively, each of the field capture optics 106 may be embodied by a different lens configuration and/or optical subassembly. For example, in some embodiments, the field capture optics 106A is embodied by a 3-glass optical lens and the field capture optics 106B is embodied by a 3-plastic optical lens. It should be appreciated that the field capture optics 106 may each be configured based on various requirements for the apparatus (e.g., thermal resistance, cost factors, and/or the like).

The field capture optics 106A are configured to enable light to enter and flow through the optics for capturing by the first image sensor 108A. In some example embodiments, the field capture optics 106A may cause the first image sensor 108A to have a narrow field of view and a longer focal length in comparison to the field of view and the focal length of the second image sensor 108B. Similarly, in some example embodiments, the field capture optics 106B are configured to enable the second image sensor 108B to have a broader field of view in comparison to the field of view of the first image sensor 108A. Additionally or alternatively, in some example embodiments, the field capture optics 106B are configured to cause the second image sensor 108B to have a shorter focal length in comparison the focal length of the first image sensor 108A. Since the first image sensor 108A has a longer focal length in comparison to the focal length of the second image sensor 108B, the first image sensor 108A may have a longer operating distance range in comparison the operating distance range of the second image sensor 108B. In an example embodiment, the operating distance range associated with an image sensor may correspond to a distance within which the image sensor is capable of capturing a focused image. Hereinafter, the operating distance range of the first image sensor 108A is referred to as a first operating distance range. Further, hereinafter, the operating distance range of the second image sensor 108B is referred to as a second operating distance range.

In some embodiments, the illuminator source 104A and/or illuminator source 104B are specifically configured based on the image sensors 108. For example, in some embodiments, the illuminator source 104B is a narrow illuminator source configured for illuminating a particular field (e.g., a narrow field). In this regard, the illuminator source 104B may be configured for producing a narrow illumination pattern that sufficiently illuminates the field of view captured by the first image sensor 108A. The illuminator source 104A may be a second illuminator source specially configured for producing a second illumination pattern that illuminates broader field (in comparison to the field produced by the illuminator source 104B) and may sufficiently illuminate the field of view captured by the first image sensor 108A.

In an example embodiment, the aimer LED 110 may be embodied by any of a number of light generation components. In some embodiments, the aimer LED 110 is embodied by one or more light emitting diodes ("LED"), laser emitting diodes, and/or the like. In some embodiments, the aimer LED 110 is associated with pattern projection optics for producing a particular aimer pattern from the light produced by the aimer LED 110. It should be appreciated that one or more parameters of the aimer LED 110 (e.g., intensity, aperture, or the like) as well as one or more parameters of corresponding pattern projection optics (e.g., a lens angle or other design, lens material, or the like) may influence the aimer pattern projection. For example, the aimer pattern may change based on an operating distance of the imaging engine 102 from an object being scanned.

The depth sensor 112 may include suitable logic/circuitry that may enable the depth sensor 112 to determine an operating distance of the imaging device 100 from an object that is to be captured. In an example embodiment, the depth sensor 112 may be configured to generate a depth signal that may be indicative of the operating distance. In some examples, the depth sensor 112 may utilize one or more known technologies such as, not limited to, a time of flight (TOF), a dual-camera based depth sensing technique, and/or a structured light based depth sensing technique, to determine the operating distance of the imaging device 100 from the object.

The trigger button 114 may include suitable logic/circuitry that may enable the trigger button to generate a trigger signal. In some examples, the trigger button 114 may be either a mechanical button or an electronic button. In implementations, where the trigger button may correspond to a mechanical button, the trigger button 114 may include various mechanical features such as springs, push buttons, grooves, and/or the like. In implementations, where the trigger button 114 corresponds to the electronic button, the trigger button 114 may correspond to capacitive touch buttons, resistive touch buttons, and/or the like. In some examples, the scope of the disclosure is not limited to the trigger button 114 being implemented as mechanical buttons or electronic buttons. In an example embodiment, the trigger button 114 may be implemented as a virtual button such as a touch button or gesture based button, where the trigger signal is generated by a software and/or firmware application(s) installed to and/or executed via the imaging device 100.

The control unit 116 comprises a computing device, and/or computer hardware, software, firmware, and/or a combination thereof, configured to perform various specially programmed operations and/or communicate with the various other components depicted with respect to the imaging device 100. The structure of the control unit 116 is further described in conjunction with FIG. 2.

Figure 2:
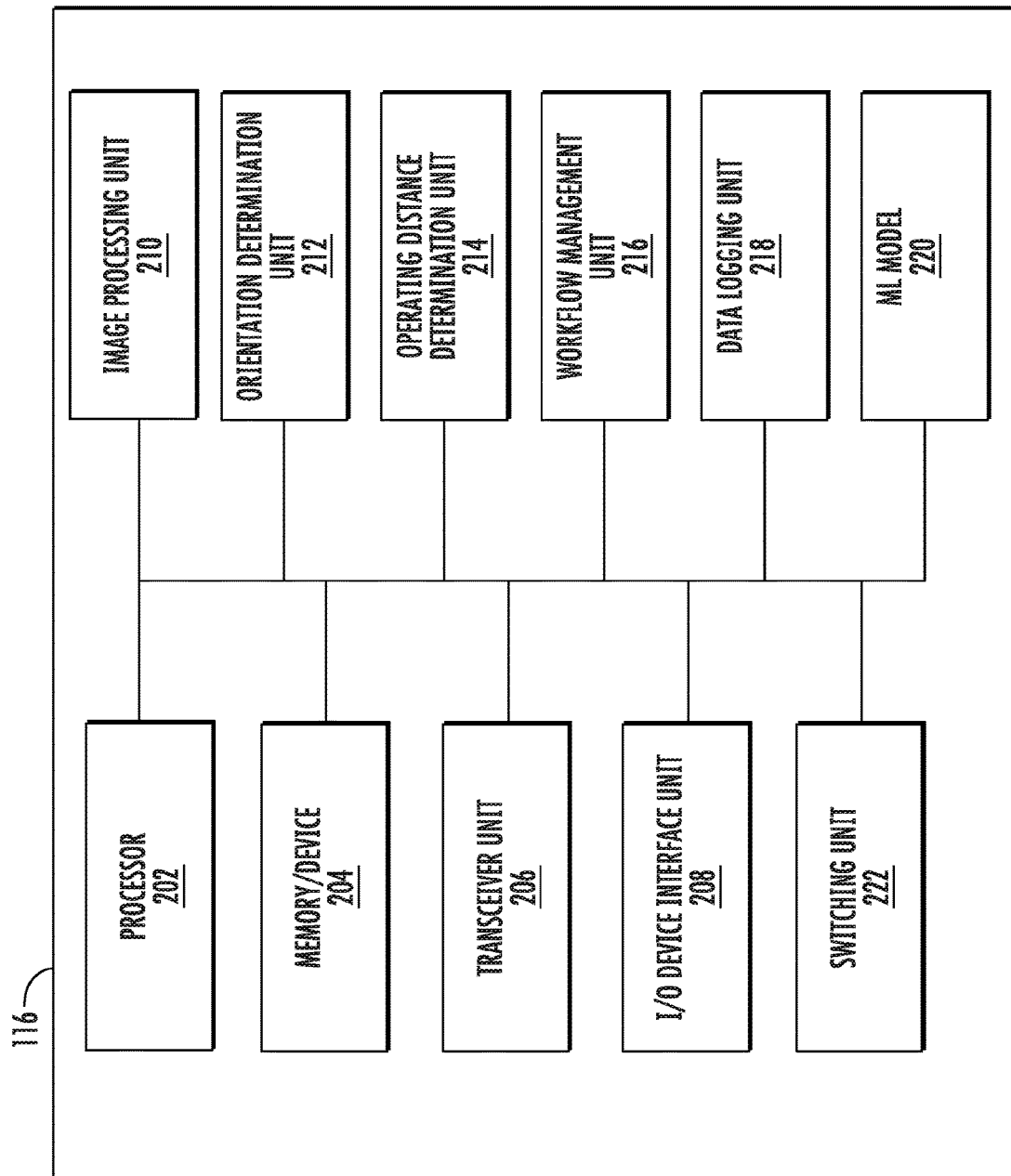
FIG. 2 illustrates a block diagram of a control unit, according to one or more embodiments described herein.

FIG. 2 illustrates a block diagram of the control unit 116, according to one or more embodiments described herein. The control unit 116 includes a processor 202, a memory device 204, a transceiver 206, an Input/Output (I/O) device interface unit 208, an image processing unit 210, an orientation determination unit 212, an operating distance determination unit 214, a workflow management unit 216, a data logging unit 218, a machine learning model 220, and a switching unit 222.

The processor 202 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 2 as a single processor, in an embodiment, the processor 202 may include a plurality of processors and signal processing modules. The plurality of processors may be embodied on a single electronic device or may be distributed across a plurality of electronic devices collectively configured to function as the circuitry of the imaging device 100. The plurality of processors may be in operative communication with each other and may be collectively configured to perform one or more functionalities of the circuitry of the imaging device 100, as described herein. In an example embodiment, the processor 202 may be configured to execute instructions stored in the memory device 204 or otherwise accessible to the processor 202. These instructions, when executed by the processor 202, may cause the circuitry of the imaging device 100 to perform one or more of the functionalities as described herein.

Whether configured by hardware, firmware/software methods, or by a combination thereof, the processor 202 may include an entity capable of performing operations according to embodiments of the present disclosure while configured accordingly. Thus, for example, when the processor 202 is embodied as an ASIC, FPGA or the like, the processor 202 may include specifically configured hardware for conducting one or more operations described herein. Alternatively, as another example, when the processor 202 is embodied as an executor of instructions, such as may be stored in the memory device 204, the instructions may specifically configure the processor 202 to perform one or more algorithms and operations described herein.

Thus, the processor 202 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 204 may include suitable logic, circuitry, and/or interfaces that are adapted to store a set of instructions that is executable by the processor 202 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory device 204 may be integrated with the processor 202 on a single chip, without departing from the scope of the disclosure.

The transceiver 206 may correspond to a communication interface that may facilitate transmission and reception of messages and data to and from various devices. Examples of the transceiver 206 may include, but are not limited to, an antenna, an Ethernet port, a USB port, a serial port, or any other port that can be adapted to receive and transmit data. The transceiver 206 transmits and receives data and/or messages in accordance with the various communication protocols, such as, without limitation, Bluetooth®, Infra-Red, I2C, TCP/IP, UDP, and 2G, 3G, 4G or 5G communication protocols.

The Input/Output (I/O) device interface unit 208 may include suitable logic and/or circuitry that may be configured to communicate with the one or more components of the imaging engine 102, in accordance with one or more device communication protocols such as, without limitation, I2C communication protocol, Serial Peripheral Interface (SPI) communication protocol, Serial communication protocol, Control Area Network (CAN) communication protocol, and 1-Wire® communication protocol. In an example embodiment, the I/O device interface unit 208 may communicate with the first image sensor 108A and the second image sensor 108B. Additionally, the I/O device interface unit 208 may be configured to communicate with a depth sensor 112, a trigger button 114, the aimer LED 110, and the illuminator sources 104. Some examples of the I/O device interface unit 208 may include, but not limited to, a Data Acquisition (DAQ) card, an electrical drives driver circuit, and/or the like.

In an example embodiment, the image processing unit 210 may include suitable logic/circuitry that may enable the image processing unit 210 to capture and process one or more images. For example, the image processing unit 210 may be configured to cause the first image sensor 108A and the second image sensor 108B to capture one or more images, as is further described in conjunction with FIG. 4. Further, image processing unit 210 may be configured to process of the one or more images (captured by the second image sensor 108B and first image sensor 108A), as is further described in FIG. 3. For example, the image processing unit 210 may be configured to determine a quality score for each of the one or more images based on one or more image parameters associated with the one or more images, as is further described in FIG. 14. In some examples, the one or more image parameters may include, but not limited to, an image sharpness, an image brightness, and a presence of machine readable code in the one or more images. The image processing unit 210 may be implemented using one or more technologies, such as, without limitation, Field programmable Gate Array (FPGA), Application Specific Integrated Circuit (ASIC), and the like.

Figure 11:
FIG. 11 illustrates another flowchart of a method for determining an operating distance of the imaging device from an object, according to one or more embodiments described herein.

The orientation determination unit 212 may include suitable logic/circuitry that may enable the orientation determination unit 212 to determine an orientation of the imaging device 100, as is further described in conjunction FIG. 11. Additionally, the orientation determination unit 212 may generate an orientation signal indicative of the orientation of the imaging device 100. In an example embodiment, the orientation of the imaging device 100 may correspond to an alignment of the imaging device 100 with respect to a ground surface of the work environment where the operator of the imaging device 100 is performing an operation. In some examples, the orientation of the imaging device 100 may be represented by pan, tilt, and yaw of the imaging device 100. In an example embodiment, the orientation determination unit 212 may include a gyroscope and/or accelerometer. Additionally or alternatively, the orientation determination unit 212 may be implemented using one or more technologies, such as, without limitation, FPGA, ASIC, and the like.

Figure 9:
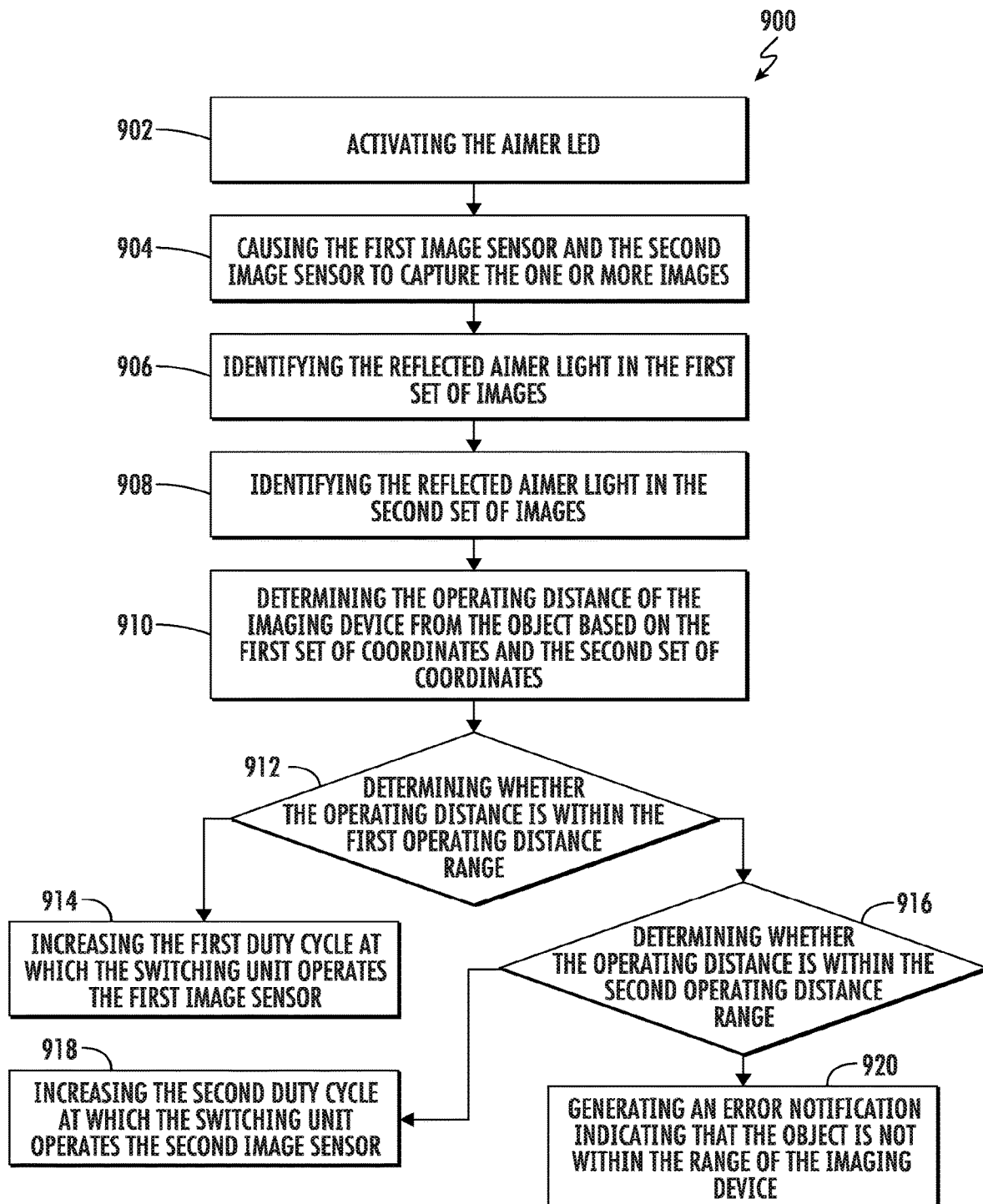
FIG. 9 illustrates another flowchart of a method for modifying the first duty cycle and the second duty cycle, according to one or more embodiments described herein.
Figure 10:
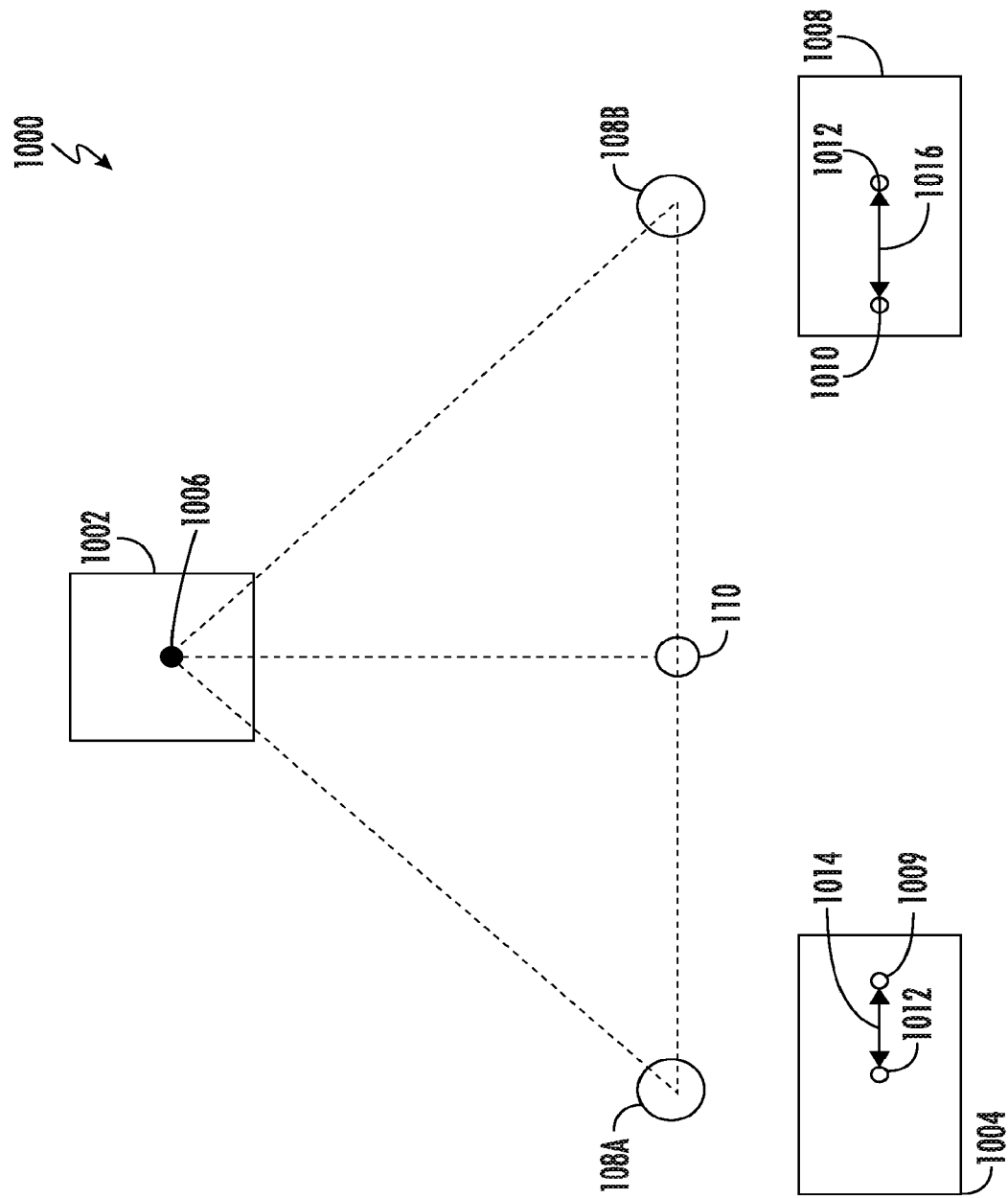
FIG. 10 illustrates a geometrical representation of a parallax method, according to one or more embodiments described herein.

The operating distance determination unit 214 may include suitable logic/circuitry that may enable the operating distance determination unit 214 to determine the operating distance of the imaging device 100, as is further described in conjunction with FIGS. 9, 10, and 11. In some examples, the operating distance determination unit 214 may determine the operating distance based on the orientation of the imaging device 100, as is further described in conjunction with FIG. 12. In yet another embodiment, the operating distance determination unit 214 may determine the operating distance based on the one or more images captured by the first image sensor 108A and the second image sensor 108B. In yet another embodiment, the operating distance determination unit 214 may determine the operating distance based on the depth signal received from the depth sensor 112, as is further described in conjunction with FIG. 11. Additionally or alternatively, the operating distance determination unit 214 may be implemented using one or more technologies, such as, without limitation, FPGA, ASIC, and the like.

The workflow management unit 216 may include the suitable logic/circuitry that may enable the workflow management unit 216 to receive a workflow through the transceiver 206 from a central server (not shown). In an example embodiment, the workflow management unit 216 may be configured to determine the one or more tasks that are to be performed based on a manifest associated with the workflow, as described in conjunction with FIG. 7. Further, in some examples, the workflow management unit 216 may be configured to retrieve metadata pertaining to the one or more tasks, as is described in conjunction with FIG. 7. Additionally or alternatively, the workflow management unit 216 may be implemented using one or more technologies, such as, without limitation, FPGA, ASIC, and the like.

Figure 17:
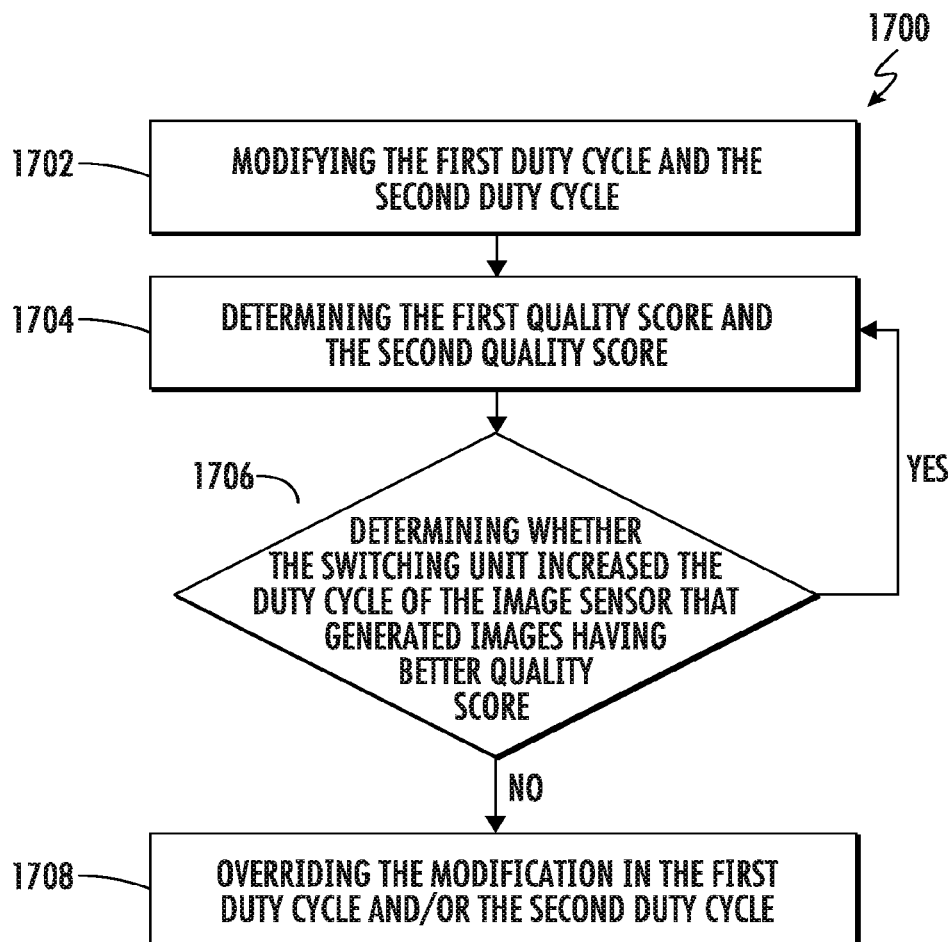
FIG. 17 illustrates a flowchart of a method for modifying the first duty cycle and the second duty cycle, according to one or more embodiments described herein.

The data logging unit 218 may include the suitable logic/circuitry that may enable the data logging unit 218 to generate historical data pertaining to the usage of the imaging device 100, as is described in conjunction with FIG. 17. For example, the data logging unit 218 may be configured to store one or more operational parameters associated with the first image sensor 108A and the second image sensor 108B, as the historical data. In an example embodiment, the one or more operational parameters associated with the first image sensor 108A and the second image sensor 108B may include at least a measure of a first duty cycle and a second duty cycle at which the first image sensor 108A and the second image sensor 108B, respectively, are operated, an exposure time period for the first image sensor 108A and the second image sensor 108B, an illumination setting associated with the first image sensor 108A and the second image sensor 108B. Additionally, or alternatively, the data logging unit 218 may be configured to store the metadata associated with the task performed using the imaging device 100 as the historical data. Additionally or alternatively, the data logging unit 218 may be implemented using one or more technologies, such as, without limitation, FPGA, ASIC, and the like.

Figure 18:
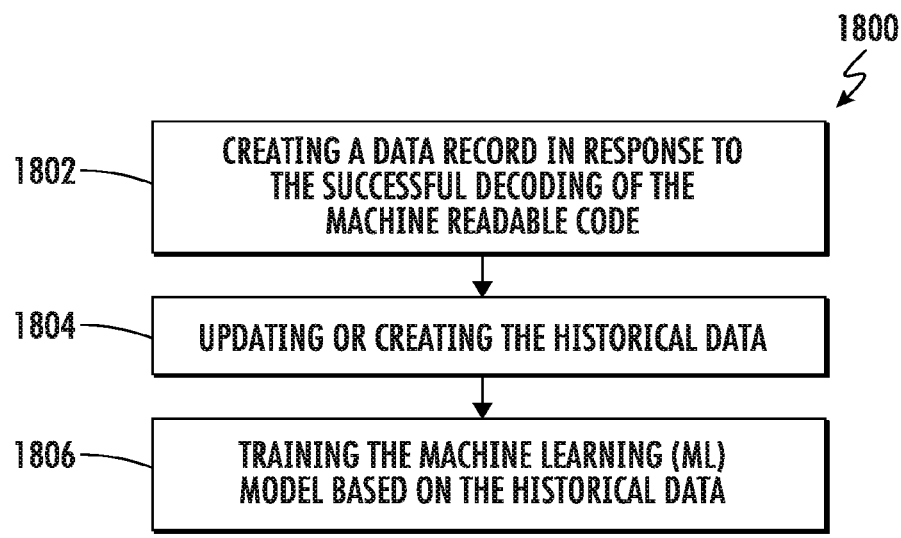
FIG. 18 illustrates a flowchart for modifying the first duty cycle and the second duty cycle, according to one or more embodiments described herein.

The machine learning (ML) model 220 may include the suitable logic/circuitry that may enable the machine learning model 220 to predict the one or more operational parameters of the first image sensor 108A and the second image sensor 108B, as is further described in conjunction with FIG. 18. In an example embodiment, the first image sensor 108A and the second image sensor 108B may be operated based on the predicted one or more operational parameters. Additionally or alternatively, the machine learning model 220 may be implemented using one or more technologies, such as, without limitation, FPGA, ASIC, and the like.

The switching unit 222 may include the suitable logic/circuitry that may enable the switching unit 222 operate the first image sensor 108A and the second image sensor 108B at the first duty cycle and the second duty cycle, as is further described in conjunction with FIGS. 7, 9, 12, 14, 15, 17-20. In an example embodiment, the switching unit 222 may be configured to generate a master clock signal based on which the switching unit 222 operates the first image sensor 108A and the second image sensor 108B, as is further described in conjunction with FIG. 4. In an example embodiment, the switching unit 222 may be further configured to modify the first duty cycle and the second duty cycle, as is further described in conjunction with FIGS. 7, 9, 12, 14, 15, 17-20. Additionally or alternatively, the switching unit 222 may be implemented using one or more technologies, such as, without limitation, FPGA, ASIC, and the like.

FIGS. 3, 4, 7, 9, 11, 12, and 14-20 illustrate example flowcharts of the operations performed by an apparatus, such as the imaging device 100 of FIG. 1 in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3, 4, 7, 9, 11, 12, and 14-20, when executed, convert a computer or processing circuitry into a particular machine configured to perform an example embodiment of the present invention. Accordingly, the operations of FIGS. 3, 4, 7, 9, 11, 12, and 14-20 define an algorithm for configuring a computer or processor, to perform an example embodiment. In some cases, a general purpose computer may be provided with an instance of the processor which performs the algorithm of FIGS. 3, 4, 7, 9, 11, 12, and 14-20 to transform the general purpose computer into a particular machine configured to perform an example embodiment. Additionally or alternatively, computer program code for implementing the operations may be stored to a non-transitory computer-readable storage medium, for example to enable execution via one or more connected processors, such as embodying a computer program product.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

Figure 3:
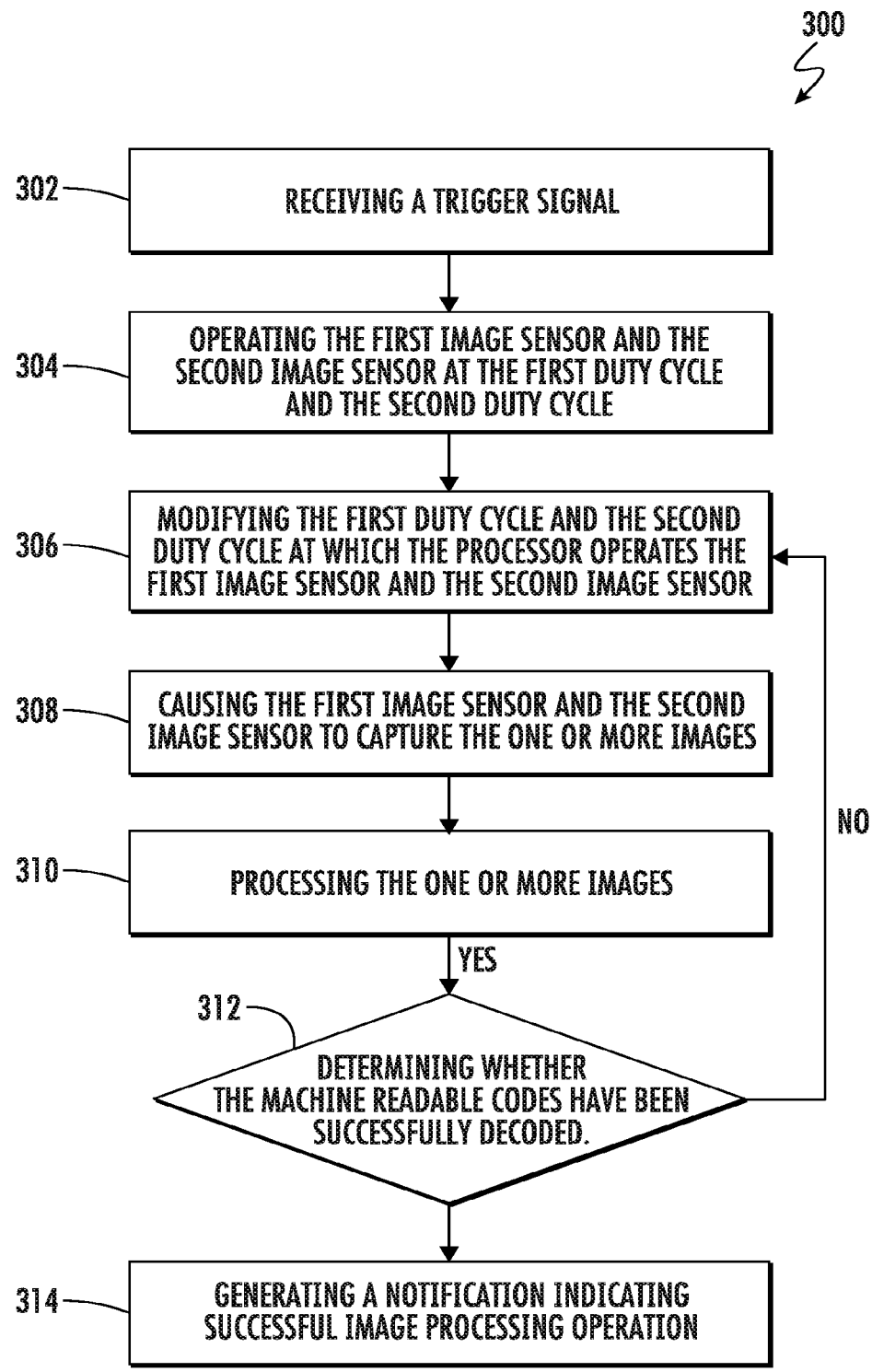
FIG. 3 illustrates a flowchart of a method for operating the imaging device, according to one or more embodiments described herein.

FIG. 3 illustrates a flowchart 300 of a method for operating the imaging device 100, according to one or more embodiments described herein.

At step 302, the imaging device 100 includes means such as, the control unit 116, the processor 202, the I/O device interface unit 208, and/or the like, for receiving a trigger signal. In an example embodiment, the I/O device interface unit 208 may be configured to receive the trigger signal from the trigger button 114, when the trigger button 114 is pressed by the operator of the imaging device 100. For example, the operator may have to capture an image of an object. The operator may place the object in the field of view of the imaging device 100 and may press the trigger button 114. Upon pressing of the trigger button 114, the trigger button 114 may transmit the trigger signal to, and/or utilizing, the I/O device interface unit 208. In an example embodiment, the trigger signal may correspond to a voltage signal that may be transmitted to the I/O device interface unit 208. In some examples, the trigger signal may correspond to any other type of signal without departing from the scope of the disclosure. Some other implementations of the trigger signals may include, a square wave signal, a pulse signal, an interrupt signal (in scenario where the trigger button 114 is realized through a software application), and/or the like.

At step 304, the imaging device 100 includes means such as, the control unit 116, the processor 202, the I/O device interface unit 208, the switching unit 222 and/or the like, for operating the first image sensor 108A and the second image sensor 108B at the first duty cycle and the second duty cycle, respectively. Operating the first image sensor 108A and the second image sensor 108B at the first duty cycle and the second duty cycle, respectively, is further described in conjunction with FIG. 4.

At step 306, the imaging device 100 includes means such as, the control unit 116, the processor 202, the I/O device interface unit 208, the switching unit 222 and/or the like, for modifying the first duty cycle and the second duty cycle at which the processor 202 operates the first image sensor 108A and the second image sensor 108B, respectively. The modification of the first duty cycle and the second duty cycle based on the workflow is further described in conjunction with FIGS. 7, 9, 11, 12, 14, 17, 18, 19, and 20. Accordingly, in at least some example embodiments, the switching unit 222 operates the first image sensor 108A and the second image sensor 108B at modified first duty cycle and modified second duty cycle, respectively.

At step 308, the imaging device 100 includes means such as, the control unit 116, the processor 202, the I/O device interface unit 208, the image processing unit 210, the switching unit 222 and/or the like, for causing the first image sensor 108A and the second image sensor 108B to capture the one or more images. In an example embodiment, since switching unit 222 operates the first image sensor 108A and the second image sensor 108B at the modified first duty cycle and the modified second duty cycle, the image processing unit 210 causes the first image sensor 108A and the second image sensor 108B to capture the one or more images during respective activation of the first image sensor 108A and the second image sensor 108B. In an example embodiment, the one or more images may include a first set of images and a second set of images, where the first set of images are captured by the first image sensor 108A and the second set of images are captured by the second image sensor 108B, respectively.

At step 310, the imaging device 100 includes means such as, the control unit 116, the processor 202, the I/O device interface unit 208, the image processing unit 210, and/or the like, for processing the one or more images. In an example embodiment, the image processing unit 210 may be configured to process the first set of images and the second set of images to decode one or more machine-readable codes (such as one-dimensional symbologies that may embody very large to ultra-small codes Code 128, Interleaved 2 of 5, Codabar, Code 93, Code 11, Code 39, UPC, EAN, MSI, or other 1D symbologies, stacked 1D symbologies that may include PDF, Code 16K, Code 49, or other stacked 1D symbologies, 2D symbologies that may include Aztec, Data Matrix, MaxiCode, QR Code, or other 2D symbologies, and/or the like) in the first set of images and the second set of images. In an example embodiment, the image processing unit 210 may utilize one or more known techniques to decode the machine readable codes in the one or more images. In some examples, the scope of the disclosure is not limited to the processing the one or more images to decode the machine readable codes. In an example embodiment, processing the one or more images may further include, but not limited to, recognizing text in the one or more images, recognizing signatures in the one or more images, and/or the like. However, for purpose of the ongoing description, it is considered that the image processing includes decoding the machine readable codes.

At step 312, the imaging device 100 includes means such as, the control unit 116, the processor 202, the I/O device interface unit 208, the image processing unit 210, and/or the like for determining whether the machine readable codes have been successfully decoded. If the image processing unit 210 determines that the machine readable codes have been successfully decoded, the image processing unit 210 may be configured to perform the step 314. However, if the image processing unit 210 determines that the decoding of the machine readable code is unsuccessful, the image processing unit 210 may be configured to repeat the step 306.

At step 314, the imaging device 100 includes means such as, the control unit 116, the processor 202, the I/O device interface unit 208, and/or the like, for generating a notification indicating successful image processing operation. For example, the processor 202 may be configured to activate a notification LED to indicate successful read. Additionally or alternatively, the processor 202 may cause an audio device (not shown) in the imaging device 100 to generate an audio signal.

Figure 4:
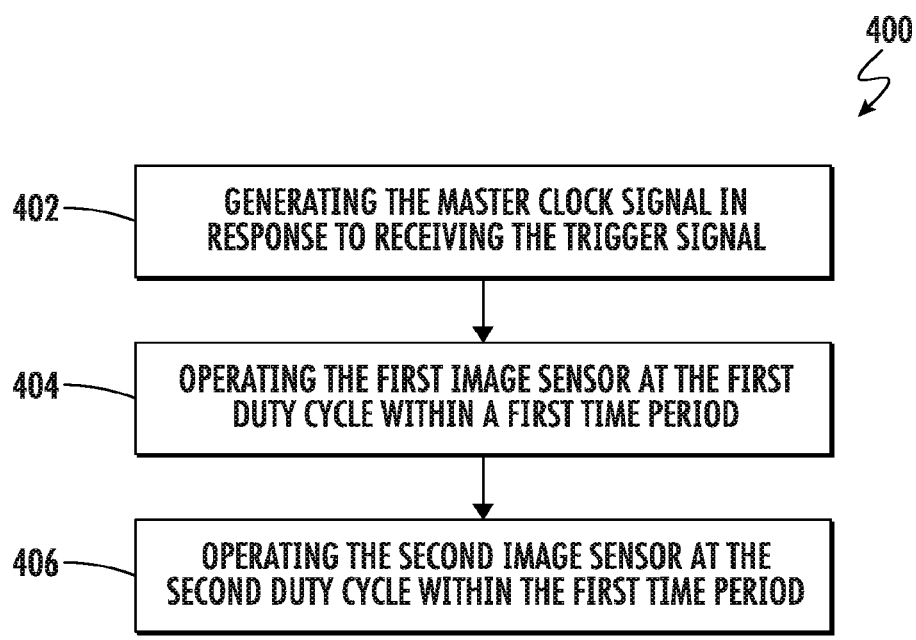
FIG. 4 illustrates a flowchart for operating a first image sensor and a second image sensor, according to one or more embodiments described herein.

FIG. 4 illustrates a flowchart 400 for operating the first image sensor 108A and the second image sensor 108B, according to one or more embodiments described herein. FIG. 4 further describes step 304 in which the first image sensor 108A and the second image sensor 108B are operated at the first duty cycle and the second duty cycle, respectively.

At step 402, the imaging device 100 includes means such as, the control unit 116, the processor 202, the I/O device interface unit 208, the switching unit 222 and/or the like, for generating the master clock signal in response to receiving the trigger signal. In some examples, the switching unit 222 may utilize one or more known methods such as phase locked loop (PLL), quartz, and/or the like to generate the master clock signal. In some examples, the master clock signal may correspond to a pulse train that may be utilized to synchronize the activation and deactivation of various components of the imaging device 100. For example, the master clock signal may be utilized to activate/reactivate the illuminator sources 104, and/or the first image sensor 108A and the second image sensor 108B. In an example embodiment, the master clock signal may have a first frequency. For example, the master clock signal may have a frequency of 120 Hertz (Hz).

At step 404, the imaging device 100 includes means such as, the control unit 116, the processor 202, the I/O device interface unit 208, the switching unit 222 and/or the like, for operating the first image sensor 108A at the first duty cycle within a first time period. Prior to operating the first image sensor 108A at the first duty cycle, the switching unit 222 may be configured to generate a timing signal based on the master clock signal. In an example embodiment, a time period of the timing signal may include a predetermined count of clock cycles of the master clock signal. For example, the time period of the timing signal includes 10 clock cycles of the master clock signal. Accordingly, the frequency of the timing signal may correspond to 12 Hz. Hereinafter, the time period of the timing signal is referred to as the first time period.

In some examples, the first duty cycle within the first time period may correspond to a second time period within the first time period during which an electronic component (such as first image sensor 108A) is activated. Accordingly, switching unit 222 may be configured to operate the first image sensor 108A for the second time period within the first time period. In some examples, the switching unit 222 may be configured to transmit an activation signal to the first image sensor 108A at the rising edge of the timing signal. Further, the switching unit 222 may be configured to transmit a deactivation signal to the first image sensor 108A at the falling edge of the timing signal. In yet another implementation, the switching unit 222 may level trigger the first image sensor 108A, without departing from the scope of the disclosure.

At step 406, the imaging device 100 includes means such as, the control unit 116, the processor 202, the I/O device interface unit 208, the switching unit 222 and/or the like, for operating the second image sensor 108B at the second duty cycle within the first time period. In some examples, the second duty cycle within the first time period may correspond to a third time period within the first time period during which an electronic component (such as the second image sensor 108B) is activated. Accordingly, switching unit 222 may be configured to operate the second image sensor 108B for the third time period within the first time period. In some examples, the switching unit 222 may be configured to transmit the activation signal to the second image sensor 108B at the falling edge of the timing signal. Further, the switching unit 222 may be configured to transmit a deactivation signal to the second image sensor 108B at the rising edge of the timing signal. In yet another implementation, the switching unit 222 may level trigger the second image sensor 108B, without departing from the scope of the disclosure.

Figure 5:
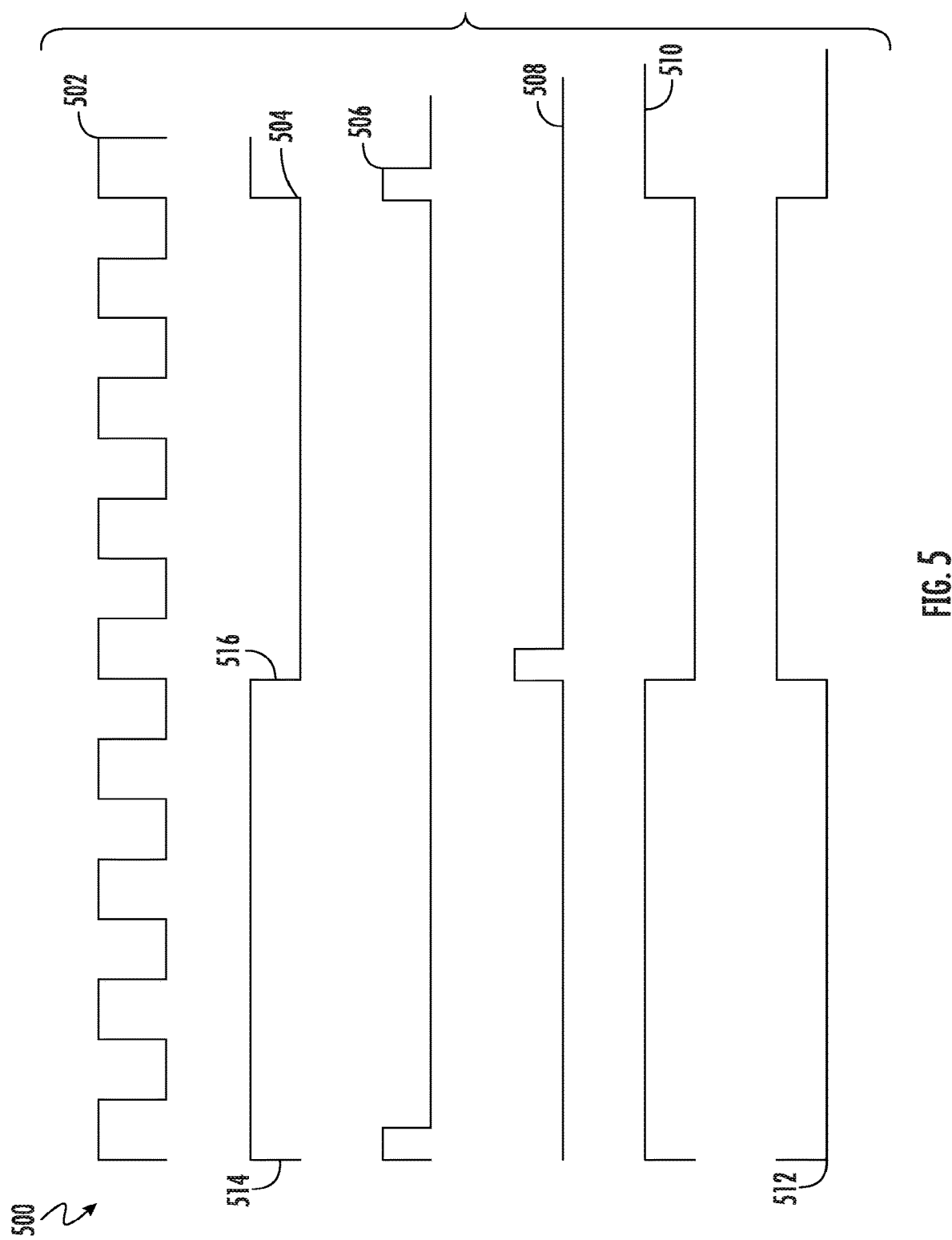
FIG. 5 illustrates a timing diagram depicting activation and deactivation of the first image sensor and the second image sensor, according to one or more embodiments described herein.

An example timing diagram of activation and deactivation of the first image sensor 108A and the second image sensor 108B is further illustrated in FIG. 5.

FIG. 5 illustrates a timing diagram 500 depicting the activation and the deactivation of the first image sensor 108A and the second image sensor 108B, according to one or more embodiments described herein. The timing diagram 500 illustrates a master clock signal 502 (generated by the switching unit 222), a timing signal 504, a first image sensor activation signal 506, a second image sensor activation signal 508, a first operational state signal 510 of first image sensor 108A, and a second operational state signal 512 of a second image sensor 108B.

In an example embodiment, the timing signal 504 has the time period that is equivalent to the eight time periods of the master clock signal 502. The time period of the timing signal 504 corresponds to the first time period. Further, at the rising edge 514 of the timing signal 504, the switching unit 222 generates the first image sensor activation signal 506, which leads to activation of the first image sensor 108A. As depicted in FIG. 5, the first operational state signal 510 depicts an ON state upon reception of the first image sensor activation signal 506. Further, as depicted by the first operational state signal 510, the first image sensor 108A is in the ON state until a falling edge 516 of the timing signal 504.

At the falling edge 516 of the timing signal 504, the switching unit 222 generates the second image sensor activation signal 508, which leads to activation of the second image sensor 108B. As depicted in FIG. 5, the second operational state signal 512 depicts the ON state upon the reception of the second image sensor activation signal 508. While the second image sensor 108B is in ON state, the first image sensor 108A is on OFF state. In an example embodiment, the ON state of the first image sensor 108A and the second image sensor 108B may correspond to a state when the first image sensor 108A and the second image sensor 108B are exposed to the light in the respective field of view.

Further, from FIG. 5, it can be observed that the first image sensor 108A is in the ON state for 50% of the first time period (i.e., the time period of the timing signal 504), while the second image sensor 108B is also in the ON state for 50% of the first time period. Accordingly, the first duty cycle (at which the first image sensor 108A is operated) is 50%, and the second duty cycle (at which the second image sensor 108B is operated) is 50%.

In some examples, the scope of the disclosure is not limited to the switching unit 222 keeping the first image sensor 108A in the ON state for the complete second time period (i.e., while the timing signal 504 is in a "HIGH" state). Similarly, the scope of the disclosure is not limited to the switching unit 222 keeping the second image sensor 108B in the ON state for the complete third time period (i.e., while the timing signal 504 is in a "LOW" state). In an example embodiment, the switching unit 222 may be configured to switch the operational state of the first image sensor 108A multiple times, during the second time period (during the timing signal 504 is in the "HIGH" state). Similarly, the switching unit 222 may be configured to switch the operational state of the second image sensor 108B multiple times during the third time period (during which the timing signal 504 is in the "LOW" state). In an example embodiment, the switching unit 222 may switch the operational states of the first image sensor 108A and the second image sensor 108B based on exposure settings associated with each of the first image sensor 108A and the second image sensor 108B. In an example embodiment, the exposure setting associated with an image sensor (e.g., the first image sensor 108A and the second image sensor 108B) may correspond to a time duration for which the image sensor receives the light signal from the ambient or respective field of view. In some examples, the processor 202 may determine the exposure settings for the first image sensor 108A and the second image sensor 108B using one or more known autoexposure algorithms. For example, the processor 202 and the image processing unit 210 may be configured to analyze the one or more images captured by the first image sensor 108A and the second image sensor 108B to determine image brightness associated with each of the one or more images. The process of determining the image brightness is further described later in conjunction with FIG. 16. Based on the image brightness, the image processing unit 210 may be configured to determine which of the one or more images are dark (which indicates underexposed image sensor) and which of the one or more images are bright (which indicates overexposed image sensor). Accordingly, the image processing unit 210 may be configured to determine the exposure settings for the first image sensor 108A and the second image sensor 108B. For instance, if the image processing unit 210 determines that the one or more images are dark (which indicates underexposed image sensor), the image processing unit 210 may instruct the switching unit 222 to activate the illuminator sources 104 during the activation of the first image sensor 108A and the second image sensor 108B. Additionally or alternatively, the image processing unit 210 may instruct the switching unit 222 to increase the exposure period of the first image sensor 108A and the second image sensor 108B. In another scenario, if the image processing unit 210 determines that the one or more images are bright (which indicates overexposure image sensor), the image processing unit 210 may instruct the switching unit 222 to deactivate the illuminator sources 104 during the activation of the first image sensor 108A and the second image sensor 108B. Additionally or alternatively, the image processing unit 210 may instruct the switching unit 222 to decrease the exposure period of the first image sensor 108A and the second image sensor 108B.

As discussed above, other components of the imaging device 100 (such as illuminator sources 104) may be activated along with the first image sensor 108A and the second image sensor 108B. For example, the switching unit 222 may be configured to activate the illuminator sources 104 along with the activation of the first image sensor 108A and the second image sensor 108B. For instance, the switching unit 222 may activate the illuminator source 104B along with the activation of the first image sensor 108A. Similarly, the switching unit 222 may activate the illuminator source 104A along with the activation of the second image sensor 108B.

Figure 6:
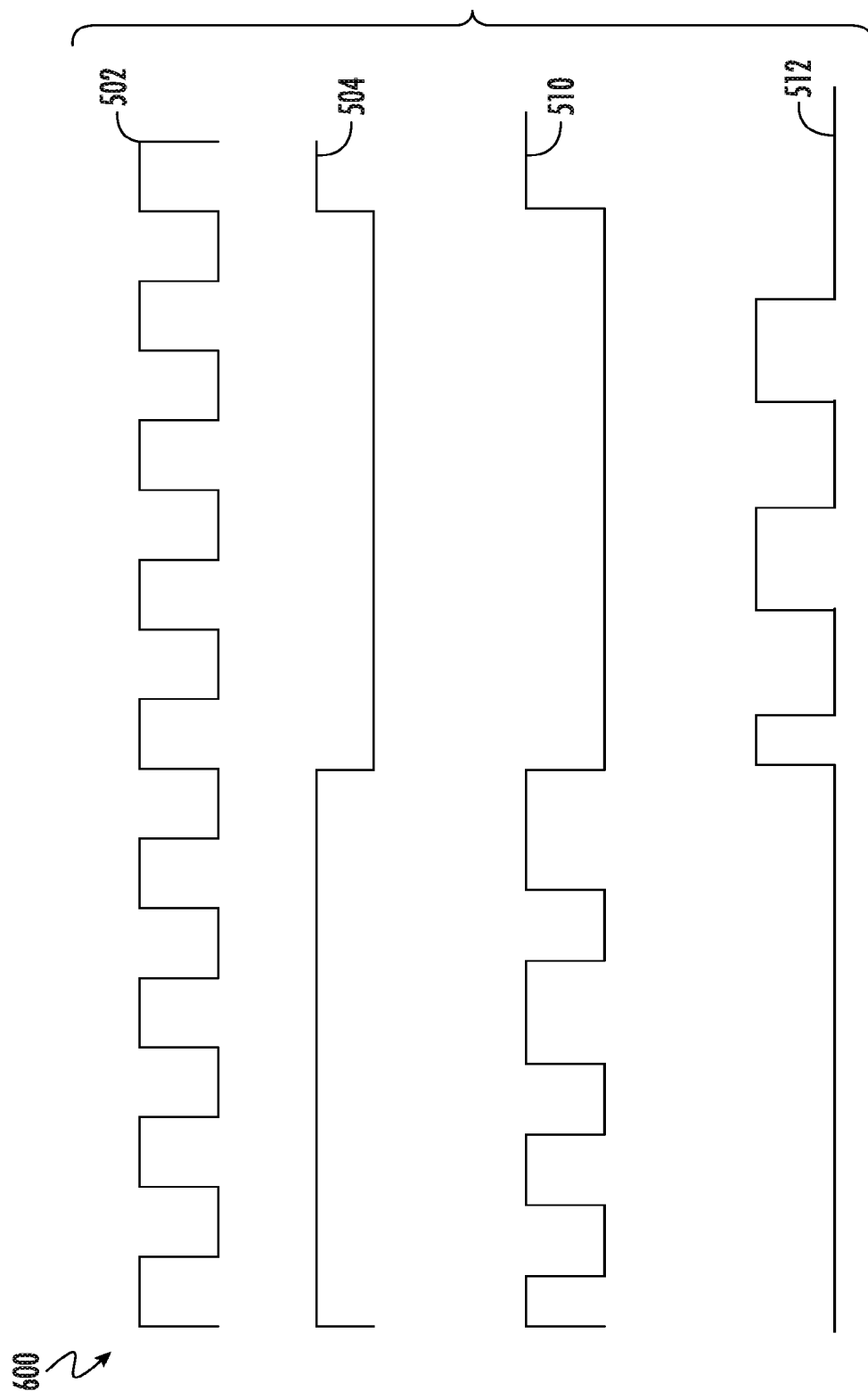
FIG. 6 illustrates another timing diagram depicting multiple activations and deactivations of the first image sensor and the second image sensor during the first time period, according to one or more embodiments described herein.

FIG. 6 illustrates another timing diagram 600 depicting multiple activations and deactivations of the first image sensor 108A and the second image sensor 108B during the first time period, according to one or more embodiments described herein. As depicted in FIG. 6, the switching unit 222 activates the first image sensor 108A (depicted by 510) four times while the timing signal 504 has a "HIGH" state. Further, the switching unit 222 activates the second image sensor 108B three times while the timing signal 504 has a "LOW" state (depicted by 512).

Figure 7:
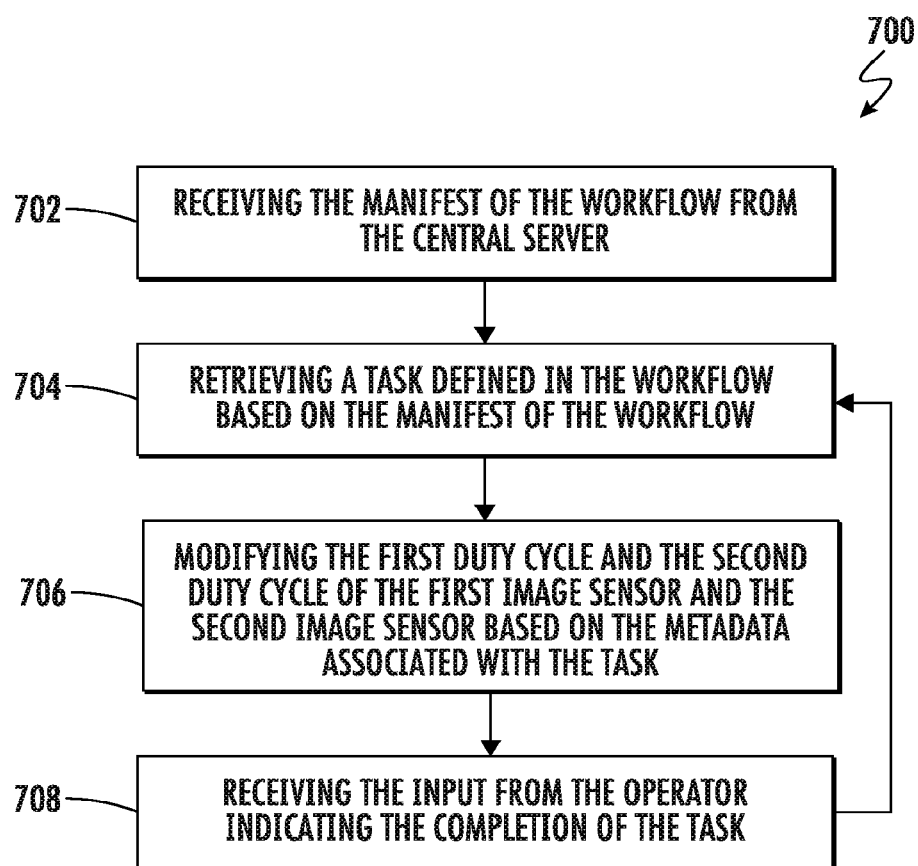
FIG. 7 illustrates a flowchart of a method for modifying a first duty cycle and a second duty cycle, according to one or more embodiments described herein.

As discussed at step 306, the first duty cycle (the amount of time the processor 202 operates the first image sensor) and the second duty cycle (the amount of time the processor 202 operates the second image sensor) are modified. FIG. 7 illustrates a flowchart 700 of a method for modifying the first duty cycle and the second duty cycle, according to one or more embodiments described herein.

At step 702, the imaging device 100 includes means such as, the control unit 116, the processor 202, the I/O device interface unit 208, the workflow management unit 216, and/or the like, for receiving the manifest of the workflow from the central server (not shown). In an example embodiment, the manifest of the workflow may include the information pertaining to the one or more tasks to be performed by operator. Additionally or alternatively, the manifest of the workflow may define a sequence in which the one or more tasks are to be performed/executed. Additionally or alternatively, the manifest of the workflow may include metadata associated with each of the one or more tasks (included in the workflow). In an example embodiment, the metadata associated with the one or more tasks may include at least a type of task, a location in the work environment at which the one or more tasks are to be performed, and information pertaining to the image sensor of the first image sensor 108A and the second image sensor 108B to be used to execute the one or more tasks. The following table, Table 1, illustrates an example manifest of the workflow:

TABLE 1

| Manifest of the workflow | | | |
|---|---|---|---|
| Tasks | Location of the task | Type of task | Image sensor |
| Task-1 | Aisle - 2. Tray - 5 | Picking task | First image sensor 108A |
| Task-2 | Aisle - 1. Tray - 4 | Placing task | Second image sensor 108B |
| Task-3 | Aisle - 3. Tray - 6 | Picking task | Second image sensor 108B |

Referring to Table 1, the task-1 corresponds to a picking task and is to be performed using the first image sensor 108A. Further, the task-3 also corresponds to the picking task and is to be performed using the second image sensor 108B.

In an example embodiment, the manifest of the workflow may be defined prior to transmitting the workflow to the operator. In some examples, a supervisor operator may define the manifest of the workflow using a computing device (e.g., central server). In an example embodiment, the supervisor operator may have the knowledge of the various locations in the work environment and may accordingly, define the manifest of the workflow. Additionally or alternatively, the supervisor operator may further be cognizant of general operating distance from which the task should be performed. Accordingly, the supervisor operator may define the image sensor to be used during execution of the task. For example, if the supervisor operator knows that the tasks is to be performed from distance that is within the first operating distance range (i.e., the operating distance range for the first image sensor 108A), the supervisor operator may populate the image sensor details (in the manifest of the workflow) as the first image sensor 108A. In this regard, the imaging device 100 may be configured to function in accordance with such image sensor details, as described herein.

At step 704, the imaging device 100 includes means such as, the control unit 116, the processor 202, the I/O device interface unit 208, the workflow management unit 216, and/or the like, for retrieving a task defined in the workflow based on the manifest of the workflow. As discussed above, the manifest of the workflow may define the sequence in which the one or more tasks are to be performed. Accordingly, based on the sequence, the workflow management unit 216 may retrieve the task that is to be performed. Upon retrieving the task, the workflow management unit 216 may be configured to generate a notification for the operator indicating the location at which the task is to be performed. In some examples, the workflow management unit 216 may cause rendering of notification information, one or more image(s), and/or other associated data to a display (not shown) associated with the imaging device 100. Alternatively, the workflow management unit 216 may transmit the notification to another device such as a wireless headphones, which may generate an audio signal indicating the location at which the operator has to perform the task.

After performing the step 704, the processor 202 may be configured to perform the step 302 and the step 304. Thereafter, the processor 202 may be configured to perform the step 704.

At step 706, the imaging device 100 includes means such as, the control unit 116, the processor 202, the I/O device interface unit 208, the workflow management unit 216, the switching unit 222 and/or the like, for modifying the first duty cycle and the second duty cycle of the first image sensor 108A and the second image sensor 108B based on the metadata associated with the task. More specifically, the switching unit 222 may modify the first duty cycle and the second duty cycle based on the information pertaining to the image sensor included in the metadata associated with the task. For example, if the operator is performing the task-1 (refer table 1), the switching unit 222 may determine that the first image sensor 108A is to be used to perform the task (from the metadata associated with the Task-1). Accordingly, the switching unit 222 may be configured to increase the first duty cycle at which the switching unit 222 operates the first image sensor 108A. Concurrently, the switching unit 222 may be configured to reduce the second duty cycle at which the switching unit 222 operates the second image sensor 108B. In an example embodiment, the switching unit 222 may be configured to increase the first duty cycle incrementally by a predetermined amount after each first time period. In an example embodiment, the predetermined amount (by which the first duty cycle and the second duty cycle are modified) is pre-stored in the memory device 204 during the manufacturing of the imaging device 100. For example, the switching unit 222 may be configured to increase the first duty cycle by 5% after each first time period. Therefore, initially during first time period, the switching unit 222 may operate the first image sensor 108A at 50% duty cycle within the first time period. In the subsequent first time period, the switching unit 222 may be configured to operate the first image sensor 108A at 55% duty cycle within the subsequent first time period and so forth. Thereafter, the processor 202 may be configured to perform the steps 306-314.

At step 708, the imaging device 100 includes means such as, the control unit 116, the processor 202, the I/O device interface unit 208, the workflow management unit 216, the switching unit 222 and/or the like, for receiving an input from the operator indicating the completion of the task. In some examples, the operator may provide the input through the display (not shown) associated with the imaging device, or through the trigger button 114, through audio input. For instance, the operator may speak an audio prompt such as "Done" in the wireless headphones to indicate the completion of the task. Thereafter, the workflow management unit 216 may be configured to repeat the step 704.

In some examples, the scope of disclosure is not limited to having a fixed predetermined amount by which the first duty cycle and the second duty cycle are modified. In an example embodiment, the predetermined amount is configurable based on an input provided by the operator. For example, the operator may use the imaging device to scan one or more configuration machine readable codes to modify and/or otherwise set the value of predetermined amount. In another embodiment, the operator may utilize other input means (such as predetermined pattern of pressing the trigger button) to modify and/or otherwise set the value of the predetermined amount. In an example embodiment, the modified first duty cycle and the modified second duty cycle is further illustrated in FIG. 8.

Figure 8:
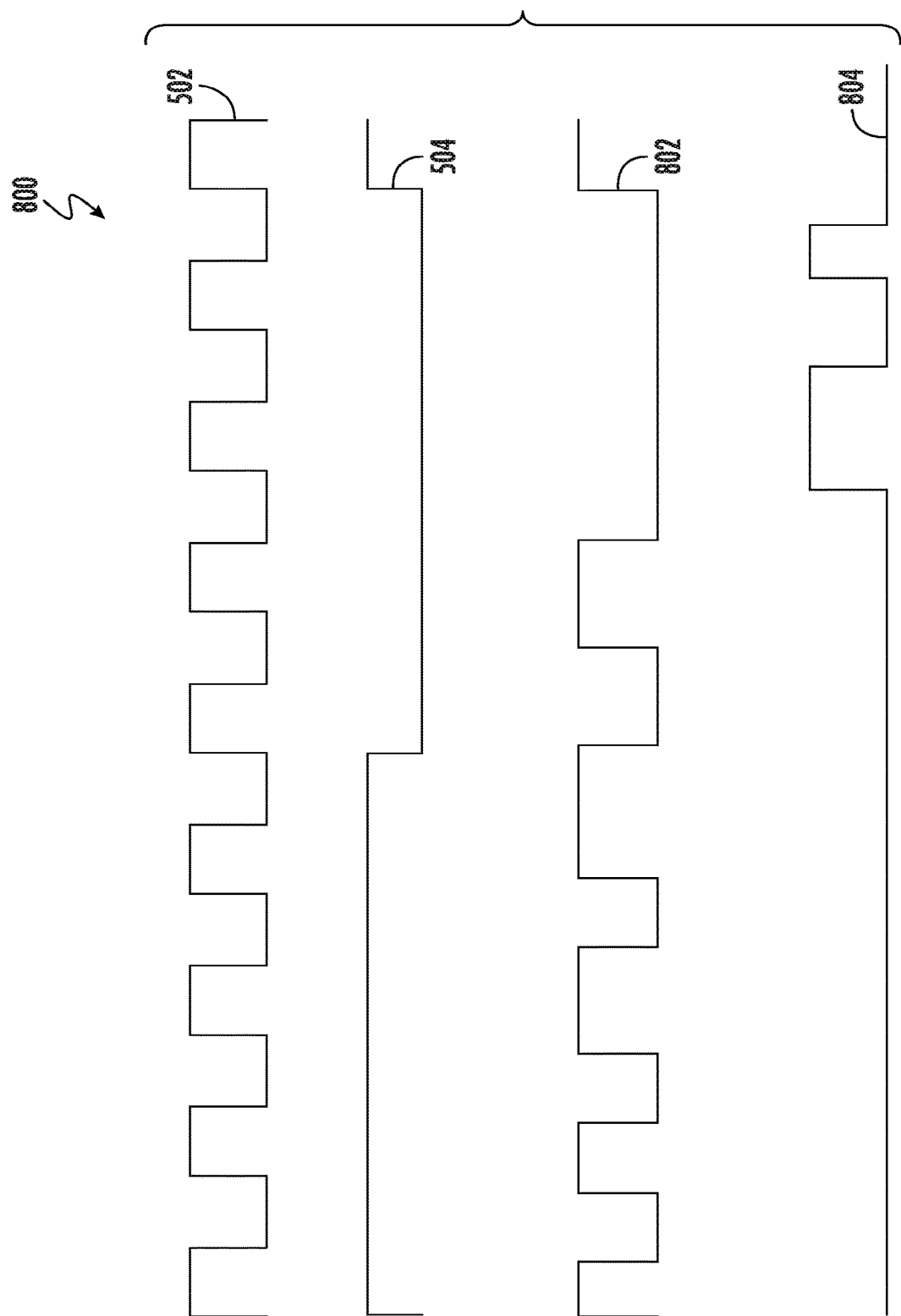
FIG. 8 illustrates another timing diagram depicting activation and deactivation of the first image sensor and the second image sensor, according to one or more embodiments described herein.

FIG. 8 illustrates another timing diagram 800 depicting activation and deactivation of the first image sensor 108A and the second image sensor 108B, according to one or more embodiments described herein.

As depicted in FIG. 8, the modified first duty cycle (depicted by 802) of the first image sensor 108A is greater than the modified second duty cycle (depicted by 804) of the second image sensor 108B. Further, it can be observed that the modified first duty cycle (depicted by 802) is greater than the first duty cycle (depicted by 510). Additionally, it can be observed that, in some example contexts, the modified second duty cycle (depicted by 804) is less than the second duty cycle (depicted by 512).

In some examples, the scope of the disclosure is not limited to the switching unit 222 modifying the first duty cycle and the second duty cycle of the first image sensor 108A and the second image sensor 108B based on the metadata associated with the task. For example, in certain implementations, the metadata associated with the task may not include the information pertaining to the image sensor to be used to perform the task. In such an embodiment, the switching unit 222 may be configured to modify the first duty cycle and the second duty cycle based on at least the operating distance of imaging device 100 from the object to be scanned or captured, as is further described in conjunction with FIG. 9.

FIG. 9 illustrates another flowchart 900 of a method for modifying the first duty cycle and the second duty cycle, according to one or more embodiments described herein.

At step 902, the imaging device 100 includes means such as, the control unit 116, the processor 202, the I/O device interface unit 208, and/or like, for activating the aimer LED 110. Upon activation of the aimer LED 110, the aimer source generates aimer light that may reflect from the source of the object to be captured.

While the aimer LED 110 is activated, at step 904, the imaging device 100 includes means such as, the control unit 116, the processor 202, the I/O device interface unit 208, the image processing unit 210, and/or like, for causing the first image sensor 108A and the second image sensor 108B to capture the one or more images. In an example embodiment, since the switching unit 222 operates the first image sensor 108A and the second image sensor 108B at the first duty cycle and the second duty cycle (as described in the step 304), accordingly, the image processing unit 210 captures the one or more images based on the first duty cycle and the second duty cycle. For example, the image processing unit 210 captures the one or more images when switching unit 222 operates the first image sensor 108A and the second image sensor 108B at 50% duty cycle. However, the scope of the disclosure may encompass other variations in the value of the first duty cycle (at which the first image sensor 108A is operated) and the second duty cycle (at which the second image sensor 108B is operated). In yet another implementations, while the aimer LED 110 is activated, image processing unit 210 and the switching unit 222 may cause the first image sensor 108A and the second image sensor 108B to operate simultaneously, without departing from the scope of the disclosure.

As discussed, the one or more images include the first set of images and the second set of images captured by the first image sensor 108A and the second image sensor 108B, respectively. Since the first image sensor 108A and the second image sensor 108B captures the first set of images and the second set of images, respectively, while the aimer LED 110 is activated, the first set of images and the second set of images includes the image of reflected aimer light.

At step 906, the imaging device 100 includes means such as, the control unit 116, the processor 202, the I/O device interface unit 208, the image processing unit 210, the operating distance determination unit 214 and/or like, for identifying the reflected aimer light in the first set of images. In an example embodiment, the image processing unit 210 may utilize one or more known techniques such as, without limitation, color saturation, and object identification techniques to identify the reflected aimer light in the first set of images. For instance, to identify the reflected aimer light, the image processing unit 210 may be configured to compare the first set of images with known images of the reflected aimer light by utilizing know image feature matching algorithms such as Scale Invariant Feature Transform (SIFT), speeded up robust features (SURF), and/or the like. Based on the comparison, the image processing unit 210 may be configured to identify the reflected aimer light in the first set of images. In some examples, the identifying the reflected aimer light in the first set of images leads to determination of a first set of coordinates indicating the location of the reflected aimer light in the first set of images.

Similarly, at step 908, the imaging device 100 includes means such as, the control unit 116, the processor 202, the I/O device interface unit 208, the image processing unit 210, the operating distance determination unit 214 and/or like, for identifying the reflected aimer light in the second set of images. In an example embodiment, identifying the reflected aimer light in the second set of images leads to determination of a second set of coordinates indicating the location of the reflected aimer light in the second set of images.

At step 910, the imaging device 100 includes means such as, the control unit 116, the processor 202, the I/O device interface unit 208, the image processing unit 210, the operating distance determination unit 214, and/or like, for determining the operating distance of the imaging device 100 from the object (to be scanned or captured) based on the first set of coordinates (representing location of the reflected aimer light in the first set of images) and the second set of coordinates (representing location of the reflected aimer light in the second set of images). In an example embodiment, the operating distance determination unit 214 may be configured to determine the operating distance by utilizing the parallax method. Parallax method is further illustrated in FIG. 10.

At step 912, the imaging device 100 includes means such as, the control unit 116, the processor 202, the I/O device interface unit 208, the image processing unit 210, the operating distance determination unit 214, the switching unit 222, and/or like, for determining whether the operating distance is within the first operating distance range (i.e., the range within which the first image sensor 108A generates focused image). If the switching unit 222 determines that the operating distance is within the first operating distance range, the switching unit 222 may be configured to perform the step 914. However, if the switching unit 222 determines that the operating distance is not within the first operating distance range, the switching unit 222 may be configured to perform the step 916.

At step 914, the imaging device 100 includes means such as, the control unit 116, the processor 202, the I/O device interface unit 208, the image processing unit 210, the operating distance determination unit 214, the switching unit 222 and/or like, for increasing the first duty cycle at which the switching unit 222 operates the first image sensor 108A.

At step 916, the imaging device 100 includes means such as, the control unit 116, the processor 202, the I/O device interface unit 208, the image processing unit 210, the operating distance determination unit 214, the switching unit 222 and/or like, for determining whether the operating distance is within the second operating distance range (i.e., the range within which the second image sensor 108B generates focused image). In some embodiments, the determination is performed by comparing the operating distance and second operating distance range. If the switching unit 222 determines that the operating distance is within the second operating distance range, the switching unit 222 may be configured to perform the step 918. However, if the switching unit 222 determines that the operating distance is not within the second operating distance range, the switching unit 222 may be configured to perform the step 920.

At step 918, the imaging device 100 includes means such as, the control unit 116, the processor 202, the I/O device interface unit 208, the image processing unit 210, the operating distance determination unit 214, the switching unit 222 and/or like, for increasing the second duty cycle at which the switching unit 222 operates the second image sensor 108B. In some embodiments, the second data cycle is increased by a predetermined amount, as described herein.

At step 920, the imaging device 100 includes means such as, the control unit 116, the processor 202, the I/O device interface unit 208, the image processing unit 210, the operating distance determination unit 214, the switching unit 222 and/or like, for generating an error notification indicating that the object is not within the range of the imaging device 100. Thereafter, the processor 202 may be configured to perform the steps 308 and 314.

FIG. 10 illustrates a geometrical representation 1000 of the parallax method, according to one or more embodiments described herein.

As depicted in FIG. 10, the aimer LED 110 transmits the aimer light on the object 1002. The reflected aimer light is captured by the first image sensor 108A and the second image sensor 108B. Further, as depicted in FIG. 10, the first image 1004 (captured by first image sensor 108A) depicts the reflected aimer light as 1009. Further, the reflected aimer light in the second image 1008 is depicted by 1010. The reflected aimer light 1006 in the first image 1004 is at a first distance from the origin 1012 of the first image 1004 (depicted by 1014). Similarly, the reflected aimer light 1010 in the second image 1008 is at a second distance from the origin 1016 of the second image 1008 (depicted by 1018).

In an example embodiment, the operating distance determining unit 214 may determine the operating distance of the imaging device 100 from the object 1002 according to a mathematical relation between the first distance 1014, the second distance 1018, and a third distance between the first image sensor 108A and the second image sensor 108B (depicted by 1020):

In some examples, the scope of the disclosure is not limited to determining the operating distance using parallax method. In an example embodiment, the operating distance determining unit 214 may be configured to determine the operating distance of the imaging device 100 by utilizing the depth sensor 112, as is further described in FIG. 11.

FIG. 11 illustrates another flowchart 1100 of a method for determining the operating distance of the imaging device 100 from the object, according to one or more embodiments described herein.

At step 1102, the imaging device 100 includes means such as, the control unit 116, the processor 202, the I/O device interface unit 208, the operating distance determination unit 214, and/or like, for activating the depth sensor 112. In an example embodiment, upon activation of the depth sensor, the depth sensor 112 may be configured to project structured light on the object. Thereafter, the depth sensor 112 may be configured to capture an image of the reflected structured light. Further, the depth sensor 112 may be configured to determine the operating distance based on displacement of the structured light in the image captured by the depth sensor. Accordingly, the depth sensor 112 may generate and transmit the depth signal to the processor 202. In another implementation, the depth sensor 112 may be configured to utilize TOF technique to determine the operating distance of the imaging device 100 from the object. In yet another embodiment, the operating distance determination unit 214 may be configured to utilize the first set of images and the second set of images to determine the operating distance. For example, the operating distance determination unit 214 may be configured to determine the operating distance of the imaging device 100 from the object based on displacement in the position of the object in the first set of images from the second set of images, and the third distance between the first image sensor 108A and the second image sensor 108B. In an example embodiment, the operating distance determination unit 214 may utilize stereoscopic imaging techniques to determine the operating distance. As described herein, the duty cycle for one or more image sensors may be modified based on the determined operating distance.

In some examples, the scope of the disclosure is not limited to determining the operating distance of the imaging device 100 based on the depth sensor 112 and/or the parallax method (using the aimer LED 110). In some examples, the operating distance of the imaging device 100 may be estimated based on the orientation of the imaging device 100. Determining the operating distance based on the orientation of the imaging device 100 may be based on a hypothesis that the operator may point the imaging device 100 in an upward direction (i.e., towards the ceiling of the work environment) when the operator has to scan a distant object (i.e., an object that may be placed at a distance far away from the operator). For example, to scan the object kept on an aisle, the operator may have to point the imaging device 100 towards the aisle. If the aisle is at a height greater than the height of the operator, the operator may have to point the imaging device 100 in a forward and/or upward direction (e.g., towards the ceiling of the work environment). In another scenario, if the object is at a far distance, the operator may align the imaging device 100 to be substantially parallel to the ground of the work environment. In some scenarios, the operator may point the imaging device 100 in a downward direction (i.e., towards the ground of the work environment) when the operator has to scan the object held in the hand of the operator. Accordingly, the orientation of the imaging device 100 may be deterministic of the operating distance of the imaging device 100 from the object. The method of modifying the first duty cycle and the second duty cycle based on the orientation of the imaging device 100 is further described in conjunction with FIG. 12.

Figure 12:
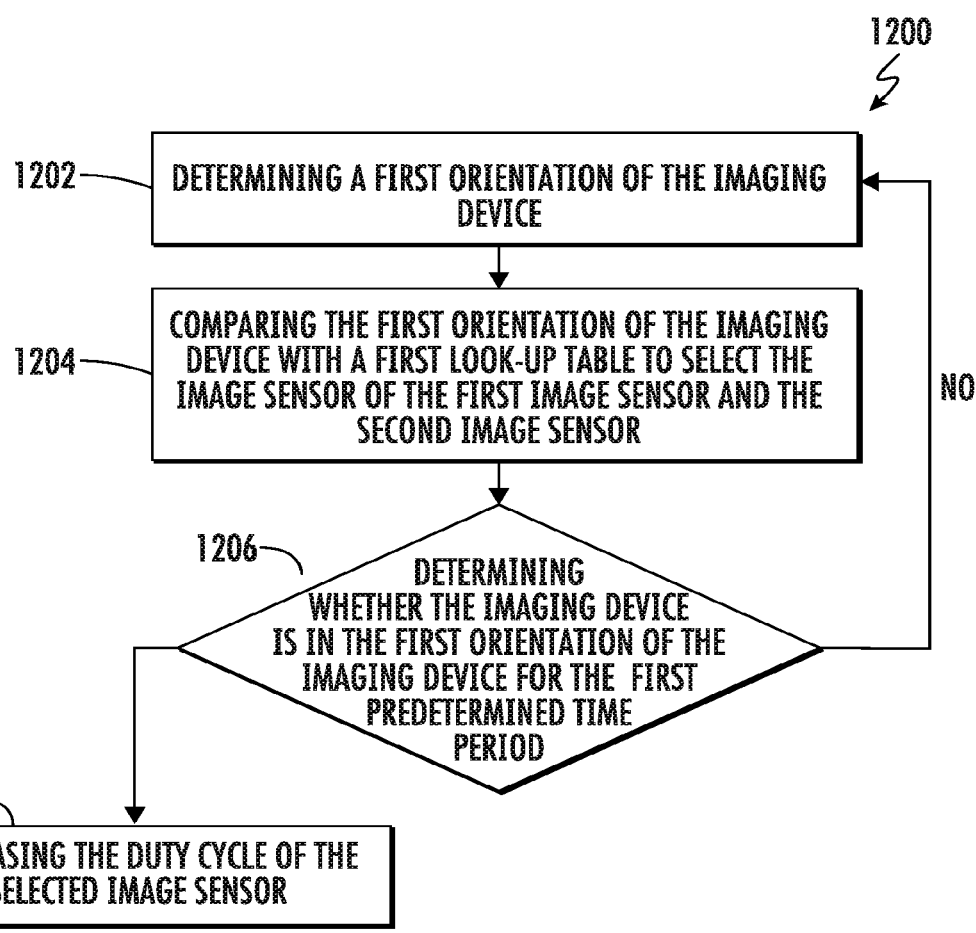
FIG. 12 illustrates another flowchart of method for modifying first duty cycle and the second duty cycle, according to one or more embodiments described herein

FIG. 12 illustrates another flowchart 1200 of a method for modifying first duty cycle and the second duty cycle, according to one or more embodiments described herein.

At step 1202, the imaging device 100 includes means such as, the control unit 116, the processor 202, the I/O device interface unit 208, the orientation determination unit 212, the operating distance determination unit 214, the switching unit 222 and/or like, for determining a first orientation of the imaging device 100. In an example embodiment, the orientation determination unit 212 may determine the first orientation of the imaging device 100 by utilizing the one or more inertial sensors such as the accelerometer and gyroscope. In an example embodiment, the orientation determination unit 212 may receive the orientation signal from the one or more inertial sensors. The orientation signal may be indicative of the first orientation of the imaging device 100. In some examples, the orientation signal may include a measure of yaw, pitch, and roll of the imaging device 100, where the measure of the yaw, pitch, and roll indicates the first orientation of the imaging device 100. In some example embodiments, the first orientation comprises a gesture, for example from operator movement of the imaging device to the first orientation.

At step 1204, the imaging device 100 includes means such as, the control unit 116, the processor 202, the I/O device interface unit 208, the orientation determination unit 212, the operating distance determination unit 214, the switching unit 222 and/or like, for comparing the first orientation of the imaging device 100 with a first look-up table to select the image sensor of the first image sensor 108A and the second image sensor 108B. In an example embodiment, the first look-up table includes a mapping between the orientation of the imaging device 100 and the information pertaining to the image sensor to be used for the corresponding orientation of the imaging device 100. In some examples, the following is an example of the first look-up table:

TABLE 2

First look-up table illustrating mapping between the orientation and the image sensor

| Orientation | Image sensor |
| --- | --- |
| Pitch: 190<br>Yaw: 0<br>Roll: 0 | First image sensor 108A |
| Pitch 190<br>Yaw 45<br>Roll: 0 | First image sensor 108A |
| Pitch 190<br>Yaw −45<br>Roll 0 | Second image sensor 108B |

Referring to table 2, the switching unit 222 may compare the first orientation with the first look-up table to determine the imaging sensor to be used. For example, if the first orientation is Pitch: 190, Yaw: 0, and Roll:0, the switching unit 222 may determine that the first image sensor 108A is to be used. Similarly, the if the first orientation is Pitch: 190, Yaw: −45, and Roll:0, the switching unit 222 may determine that the second image sensor 108B is to be used.

Those skilled in the art would appreciate that the scope of the disclosure is not limited to the switching unit 222 determining adjustments and/or settings to one or more duty cycle(s) for one or more image sensor(s), and/or the image sensor, based on the exact values of the first orientation, as illustrated in table 2. Additionally or alternatively, one or more embodiments determine adjustments and/or settings to one or more duty cycle(s) for the one or more image sensor(s) based on a look-up table of determined gestures. The switching unit 222 may consider a predetermined tolerance factor while determining which of the first image sensor 108A and the second image sensor 108B is to be used. For example, the switching unit 222 may consider the predetermined tolerance factor as ±5 degrees. Therefore, to this end, if the switching unit 222 determines that the first orientation of the imaging device 100 is Pitch: 190, Yaw: −43, and Roll:0, the switching unit 222 will still select the second image sensor 108B, as the value of the yaw is within the predetermined tolerance factor of ±5 degrees.

Additionally or alternatively, the switching unit 222 may consider a first predetermined time period for which the imaging device 100 has to be a same orientation (e.g., first orientation) prior to selecting the image sensor. For example, at step 1206, the imaging device 100 includes means such as, the control unit 116, the processor 202, the I/O device interface unit 208, the orientation determination unit 212, the operating distance determination unit 214, the switching unit 222 and/or like, for determining whether the imaging device 100 is in the first orientation of the imaging device 100 for the first predetermined time period (e.g., 5 seconds). If the switching unit 222 determines that the imaging device 100 is in the first orientation for the first predetermined time period, the switching unit 222 may select the image sensor per the first look-up table (e.g., the switching unit 222 may select the second image sensor 108B). However, if the switching unit 222 determines that the imaging device 100 is not in the first orientation for the first predetermined time period, the switching unit 222 may be configured to repeat the step 1202.

At step 1208, the imaging device 100 includes means such as, the control unit 116, the processor 202, the I/O device interface unit 208, the orientation determination unit 212, the operating distance determination unit 214, the switching unit 222 and/or like, for increasing the duty cycle of the selected image sensor, as is described above in step 704. For example, if the selected image sensor is first image sensor 108A, the switching unit 222 may be configured to increase the first duty cycle. However, if the selected image sensor is the second image sensor 108B, the switching unit 222 may be configured to increase the second duty cycle of the second image sensor 108B.

In some examples, the first look-up table (refer table 2) may be pre-stored in the memory device 204 of the imaging device 100 during the manufacturing of the imaging device 100. In another implementation, the first look-up table may be dynamically populated as is further described later in conjunction with FIG. 15.

Figure 13:
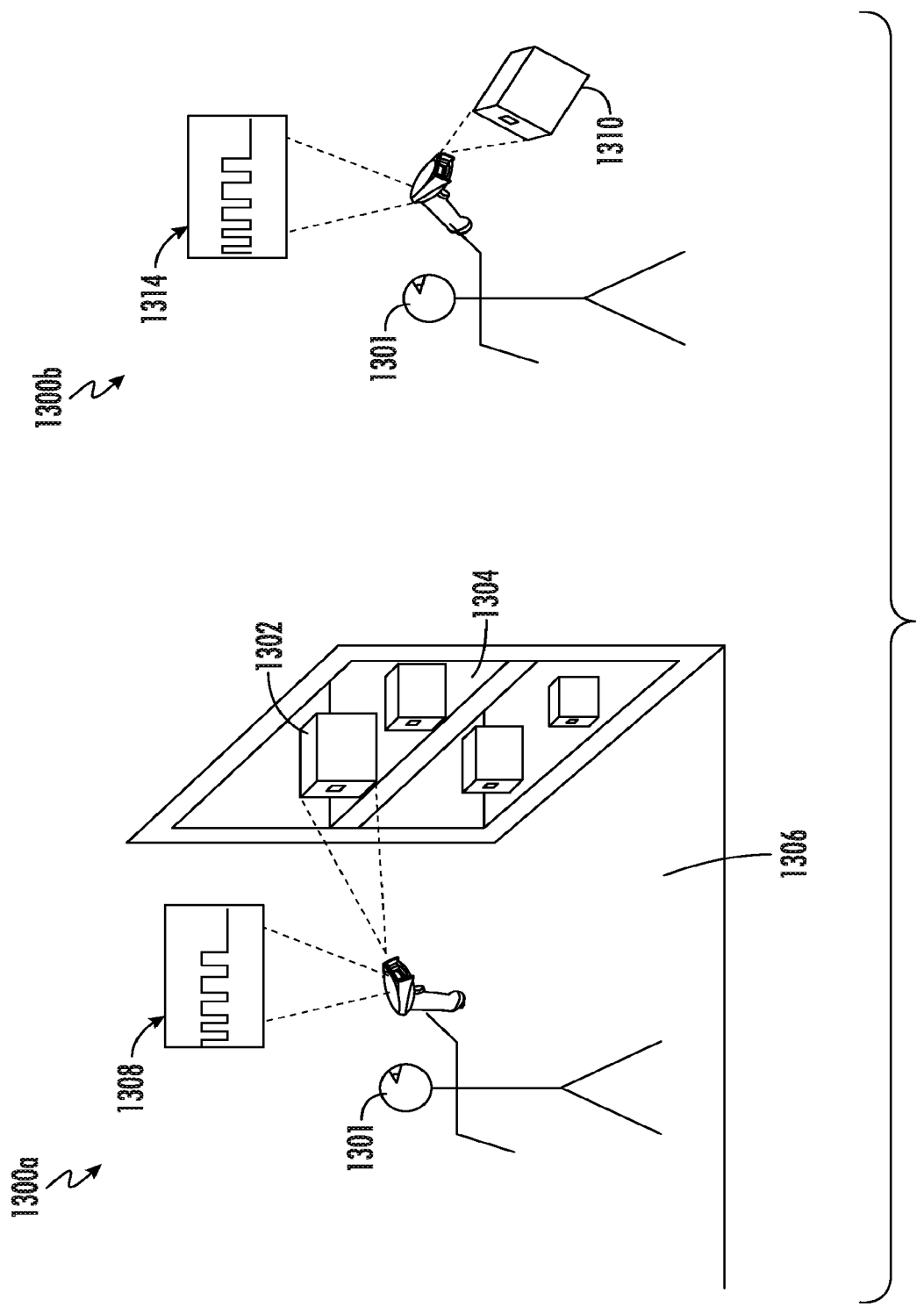
FIG. 13 illustrates an example scenarios and illustrating the modification of the first duty cycle and the second duty cycle of the first image sensor and the second image sensor based on the orientation of the imaging device, according to one or more embodiments described herein.

FIG. 13 illustrates an example scenarios 1300a and 1300b illustrating the modification of the first duty cycle and the second duty cycle of the first image sensor 108A and the second image sensor 108B based on the orientation of the imaging device 100, according to one or more embodiments described herein.

As depicted in the example scenario 1300a, the operator 1301 is scanning an object 1302 that is positioned on the aisle 1304. Further, it can be observed that object is placed at a distance (depicted by 1304) from the imaging device 100. Further, it can be observed that the imaging device 100 is almost parallel to the ground surface 1306 of the work environment. Accordingly, the orientation determination unit 212 may determine the orientation as Pitch: 190, Yaw: 0, and Roll:0. Thus, the switching unit 222 may increase the first duty cycle at which the first image sensor 108A. The timing diagram, 1308 depicts the increase in the first duty cycle. Since the first image sensor 108A has the narrow field of view, the first image sensor 108A is able to capture the focused image of the object 1302 (as the narrow field of view enables the first image sensor 108A to capture objects placed at a longer distances). Accordingly, the image processing unit 210 is configured to process the captured image of the object 1302 to, for example, decode the machine readable code printed on the object 1302.

As depicted in the example scenario 1300b, the operator 1301 is scanning an object 1310 that is held by the operator 1301 in his/her hand. Further, it can be observed that the imaging device 100, in such scenario, is pointing in a downward direction towards the ground surface 1306 of the work environment. Accordingly, the orientation determination unit 212 may determine the orientation as Pitch: 190, Yaw: −45, and Roll:0. Thus, the switching unit 222 may increase the second duty cycle at which the second image sensor 108B. The timing diagram, 1312 depicts the increase in the second duty cycle. Since the second image sensor 108B has near field of view, the second image sensor 108B is able to capture the focused image of the object 1310. Accordingly, the image processing unit 210 is configured to process the captured image of the object 1310 to, for example, decode the machine readable code printed on the object 1310.

Figure 14:
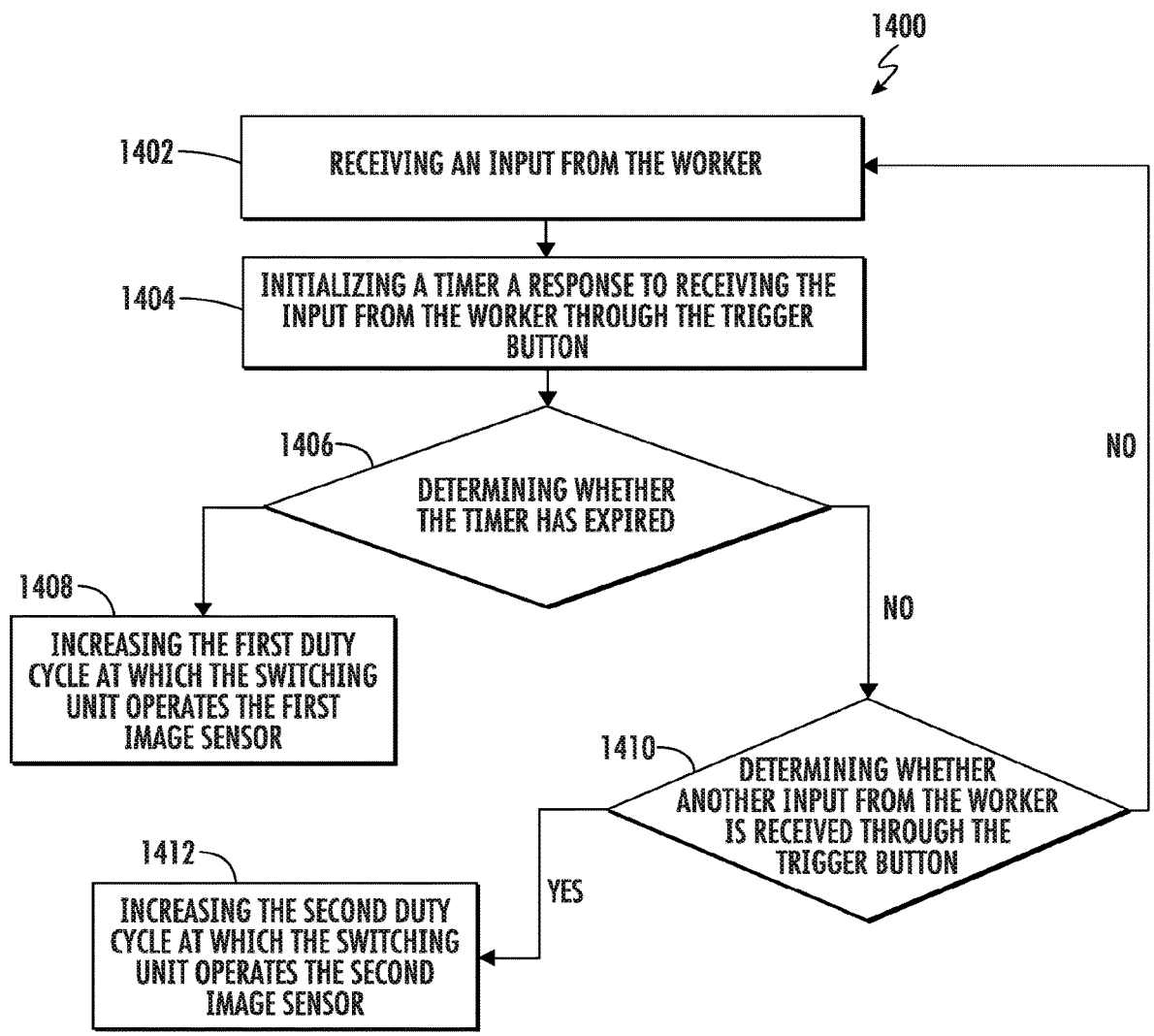
FIG. 14 illustrates a flowchart of a method for modifying the first duty cycle and the second duty cycle, according to one or more embodiments described herein.

In some examples, the switching unit 222 may modify the first duty cycle and the second duty based on a manual input or a gesture provided by the operator of the imaging device 100, as is further described in FIG. 14.

FIG. 14 illustrates a flowchart 1400 of a method for modifying the first duty cycle and the second duty cycle, according to one or more embodiments described herein.

At step 1402, the imaging device 100 includes means such as, the control unit 116, the processor 202, the I/O device interface unit 208, and/or the like, for receiving an input from the operator. In an example embodiment, the input from the operator may correspond to an input from the trigger button 124. However, the input from the operator is not limited to the input provided through the trigger button 124. In an example embodiment, the operator may utilize other means such as touch input through a display (not shown) associated with the imaging device 100, capturing a predetermined machine readable code using the imaging device 100, capturing one or more gestures performed by the operator using the first image sensor 108A and the second image sensor 108B, and/or the like, to provide the input to the imaging device 100. For the purpose of ongoing description, it is considered that the input provided by the operator is received from the trigger button 124. In an example embodiment, the I/O device interface unit 208 may detect the input from the trigger button 124 based on the reception of the trigger signal.

At step 1404, the imaging device 100 includes means such as, the control unit 116, the processor 202, the I/O device interface unit 208, and/or the like, for initializing a timer in response to receiving the input from the operator through the trigger button 124. At step 1406, the imaging device 100 includes means such as, the control unit 116, the processor 202, the I/O device interface unit 208, and/or the like, for determining whether the timer has expired. If the I/O device interface unit 208 determines that the timer has expired, the I/O device interface unit 208 may be configured to perform the step 1408. However, if the I/O device interface unit 208 determines that the timer has not expired, the I/O device interface unit 208 may be configured to perform the step 1410.

At step 1408, the imaging device 100 includes means such as, the control unit 116, the processor 202, the I/O device interface unit 208, the switching unit 222 and/or the like, for increasing the first duty cycle at which the switching unit 222 operates the first image sensor 108A by the predetermined amount. At step 1410, the imaging device 100 includes means such as, the control unit 116, the processor 202, the I/O device interface unit 208, the switching unit 222 and/or the like, for determining whether another input from the operator is received through the trigger button 124. If the I/O device interface unit 208 determines that the other input received from the operator through the trigger button 124 (based on the reception of the trigger signal), the I/O device interface unit 208 may be configured to perform the step 1412. However, if the I/O device interface unit 208 determines that the other input from the operator is not received, the I/O device interface unit 208 may be configured to repeat the step 1406.

At step 1412, the imaging device 100 includes means such as, the control unit 116, the processor 202, the I/O device interface unit 208, the switching unit 222 and/or the like, for increasing the second duty cycle at which the switching unit 222 operates the second image sensor 108B by the predetermined amount.

In some examples, the scope of the disclosure is not limited to pressing the trigger button 124 twice switch between the first image sensor 108A and the second image sensor 108B (i.e., modifying the first duty cycle and the second duty cycle). In an example embodiment, the trigger button 124 may be pressed in any other pattern to switch between the first image sensor 108A and the second image sensor 108B. For example, the trigger button 124 may be pressed for a second predetermined time period to switch between the first image sensor 108A and the second image sensor 108B. Similarly, other patterns may be conceivable by the person having ordinary skills in the art, without departing from the scope of the disclosure.

In some embodiments, the first duty cycle of the first image sensor is modified in another manner. For example, in some embodiments, the first duty cycle is decreased in response to determining the timer expired at 1406. Additionally or alternatively, in some embodiments, the second duty cycle of second duty cycle of the second image sensor is modified in another manner. For example, in some embodiments, the second duty cycle is decreased in response to determining another input is received at 1410.

Figure 15:
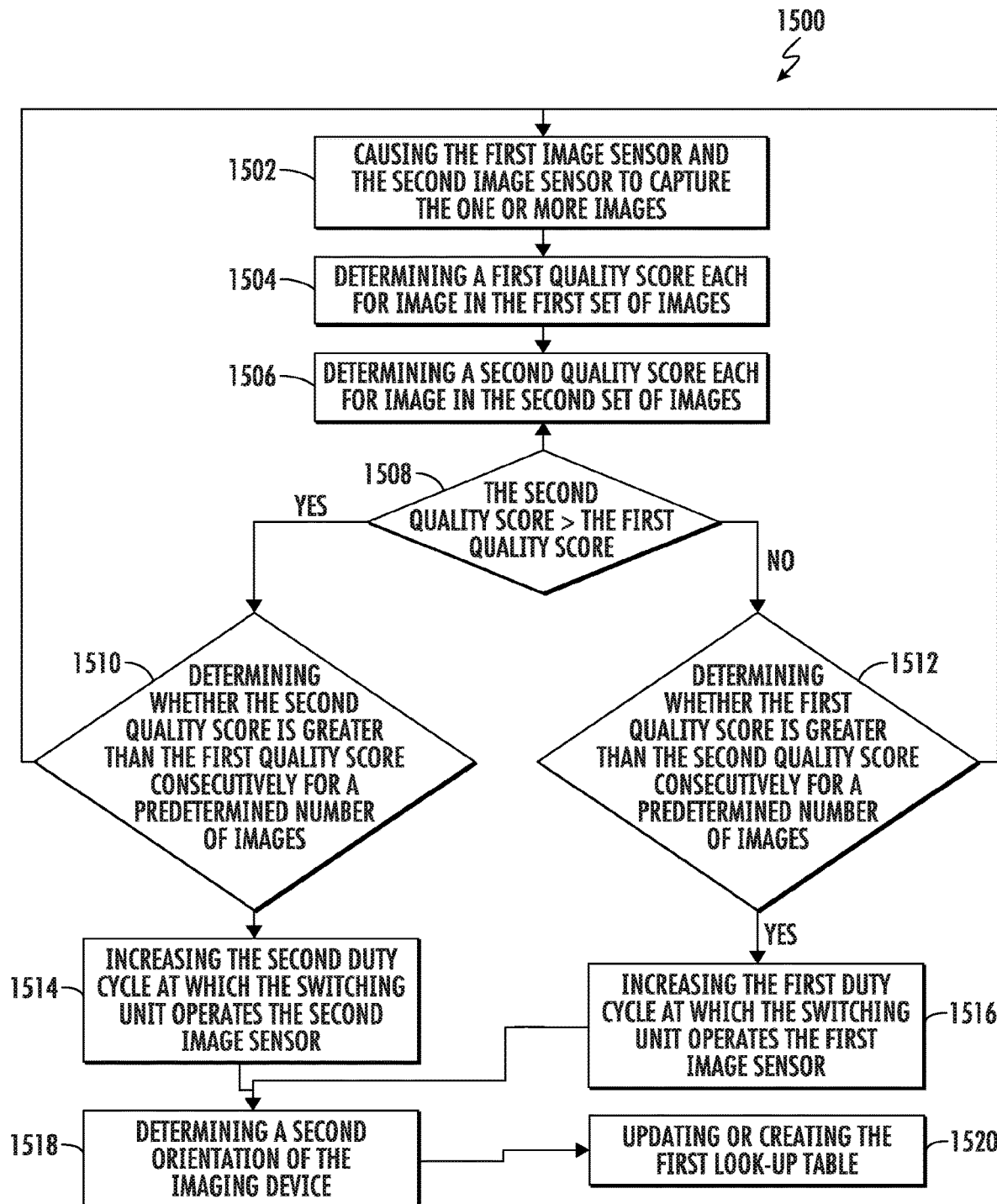
FIG. 15 illustrates a flowchart for modifying the first duty cycle and the second duty cycle, according to one or more embodiments described herein.

In some implementations, the switching unit 222 may modify the first duty cycle and the second duty cycle based on quality of the one or more image, as is further described in conjunction with FIG. 15.

FIG. 15 illustrates another method for modifying the first duty cycle and the second duty cycle, according to one or more embodiments described herein.

At step 1502, the imaging device 100 includes means such as, the control unit 116, the processor 202, the I/O device interface unit 208, the image processing unit 210, the switching unit 222 and/or the like, for causing the first image sensor 108A and the second image sensor 108B to capture the one or more images. In some examples, the image processing unit 210 may cause the first image sensor 108A and the second image sensor 108B to capture the one or more image while the first image sensor 108A and the second image sensor 108B operate at the first duty cycle and the second duty cycle, respectively. In an example embodiment, the image processing unit 210 may be configured to follow similar methodology as is described in the step 308 to capture the one or more images. As discussed, the one or more images include the first set of images and the second set of images.

As the first image sensor 108A and the second image sensor 108B capture the first set of images and the second set of images, respectively, the image processing unit 210 may be configured to store the first set of images and the second set of images in a first buffer and a second buffer, respectively.

At step 1504, the imaging device 100 includes means such as, the control unit 116, the processor 202, the image processing unit 210, and/or the like, for determining a first quality score for each image in the first set of images. In an example embodiment, the image processing unit 210 may be configured to determine the first quality score based on the one or more image parameters associated with each image in the first set of images. In some examples, the one or more image parameters may include but are not limited to image sharpness, image brightness, and a presence of machine readable code in each image in the first set of images. Accordingly, prior to determining the first quality score, the image processing unit 210 may be configured to determine a measure of the image brightness, a measure of the image sharpness, and the presence of the barcode in the image, as is further described in conjunction with FIG. 16.

At step 1504, the image processing unit 210 may be configured to determine the first quality score for each image in the first set of images. In some examples, the image processing unit 210 may determine the first quality score as the weighted sum of the measure of the image sharpness, the measure of the image brightness, and the presence of the machine readable code in the image. In some examples, the scope of the disclosure is not limited to the one or more image parameters only including the image brightness, the image sharpness, and the presence of the machine readable codes. In an example embodiment, the one or more image parameters may further include, image contrast, and/or the like. In some embodiments, only a portion of the captured images of the first set of images is/are processed, for example only a single image or subset of first captured images.

At step 1506, the imaging device 100 includes means such as, the control unit 116, the processor 202, the image processing unit 210, and/or the like, for determining a second quality score for each image in the second set of images. In an example embodiment, the image processing unit 210 may be configured to utilize similar methodology as described in the step 1504 to determine the second quality score for each image in the second set of images. In some embodiments, only a portion of the captured images of the second set of images is/are processed, for example only a single image or subset of second captured images.

In some examples, the image processing unit 210 may concurrently perform the steps 1504 and 1506 in two separate processing threads. In such an embodiment, the image processing unit 210 may be configured to retrieve an image of the first buffer (storing the first set of images) and retrieve the image from the second buffer (storing the second set of images), simultaneously. Thereafter, the image processing unit 210 may be configured to determine the first quality score and the second quality score. In another example, the image processing unit 210 may be configured to sequentially perform the steps 1504 and 1506.

At step 1508, the imaging device 100 includes means such as the control unit 116, the processor 202, the image processing unit 210, and/or the like, for determining whether the second quality score (determined for an image in the second set of images) is greater than the first quality score (determined for an image in the first set of images). If the image processing unit 210 determines that the second quality score is greater than the first quality score, the image processing unit 210 may be configured to perform the step 1510. However, if the image processing unit 210 determines that the first quality score is greater than the second quality score, the image processing unit 210 may be configured to perform the step 1512.

At step 1510, the imaging device 100 includes means such as, the control unit 116, the processor 202, the image processing unit 210, and/or the like, for determining whether the second quality score is greater than the first quality score consecutively for a predetermined number of images. For example, the image processing unit 210 determines whether the second quality score of three consecutive images captured by the second image sensor 108B is greater than the three consecutive images captured by the first image sensor 108A. If the image processing unit 210 determines that the second quality score is greater than the first quality score for the predetermined number of images, the image processing unit 210 may be configured to perform the step 1514. However, the image processing unit 210 determines that the second quality score is not greater than the first quality score consecutively for the predetermined number of images, the image processing unit 210 may be configured to repeat the step 1502.

At step 1514, the imaging device 100 includes means such as, the control unit 116, the processor 202, the image processing unit 210, the switching unit 222, and/or the like, for increasing the second duty cycle at which the switching unit 222 operates the second image sensor 108B.

At step 1512, the imaging device 100 includes means such as, the control unit 116, the processor 202, the image processing unit 210, and/or the like, for determining whether the first quality score is greater than the second quality score consecutively for a predetermined number of images. If the image processing unit 210 determines that the first quality score is greater than the second quality score consecutively for a predetermined number of images, the image processing unit 210 may be configured to perform the step 1516. However, the image processing unit 210 may be configured to repeat the step 1502.

At step 1516, the imaging device 100 includes means such as, the control unit 116, the processor 202, the image processing unit 210, the switching unit 222, and/or the like, for increasing the first duty cycle at which the switching unit 222 operates the first image sensor 108A.

In this regard, steps 1502-1516 define a subprocess for image sensor switching based on image quality determination(s) performed for one or more captured images. In some examples, the method explained in the flowchart 1500 enables the imaging device 100 to switch between the first image sensor 108A and the second image sensor 108B for ad-hoc operations. For example, in certain scenarios, the imaging device 100 may not receive the manifest associated with the workflow or metadata associated with the task. In such an embodiment, the method described in the flowchart 1500 may enable the imaging device 100 to determine which of the first image sensor 108A and the second image sensor 108B to be used to perform the ad-hoc operations. As discussed above, switching between the first image sensor 108A and the second image sensor 108B may correspond to modification in the first duty cycle and the second duty cycle at which the switching unit 222 operates the first image sensor 108A and the second image sensor 108B operates, respectively.

In an example embodiment, the processor 202 may utilize the method described in the flowchart 1500 to create and/or update the first look-up table (i.e., mapping between the orientation and the image sensor to perform the task). Creating and/or updating the first look-up table may enable the imaging device 100 to switch between the first image sensor 108A and the second image sensor 108B based on the orientation of the imaging device 100. For example, additionally or alternatively, at step 1518, the imaging device 100 includes means such as, the control unit 116, the processor 202, the image processing unit 210, the orientation determination unit 212, the switching unit 222, and/or the like, for determining a second orientation of the imaging device 100 in response to the processor 202 performing the step 1514 or the step 1512, as described in the step 1202 to determine the first orientation of the imaging device 100. Accordingly, the orientation determination unit 212 may determine the second orientation of the imaging device 100 in response the switching unit 222 selecting one imaging sensor of the first image sensor 108A and the second image sensor 108B.

Additionally or alternatively, at step 1520, the imaging device 100 includes means such as, the control unit 116, the processor 202, the image processing unit 210, the orientation determination unit 212, the data logging unit 218, and/or the like, for updating or creating the first look-up table to include the mapping between the second orientation of the imaging device 100 and the image sensor selected of the first image sensor 108A and the second image sensor 108B, based on the first quality score (determined for the image in the first set of images) and/or the second quality score (determined for the image in the second set of images).

In some examples, the scope of the disclosure is not limited to the orientation determination unit 212 performing the step 1518 in response to the modification of the first duty cycle and/or the second duty cycle. In an example embodiment, the orientation determination unit 212 may be configured to determine the second orientation in response to the successful decoding of the machine readable codes (determined at step 312). For example, after the modification of the first duty cycle and the second duty cycle (based on the first quality score and the second quality score), the image processing unit 210 may be configured to process the one or more images to, for example, decode the machine readable codes. If the image processing unit 210 determines, at step 312, that the decoding is successful, the orientation determination unit 212 may be configured to determine the second orientation of the imaging device. In some examples, the orientation determination unit 212 may determine the second orientation contemporaneously with the generation of the notification indicating successful decoding of the machine readable code. Thereafter, the orientation determination unit 212 may be configured to update the first look-up table.

Figure 16:
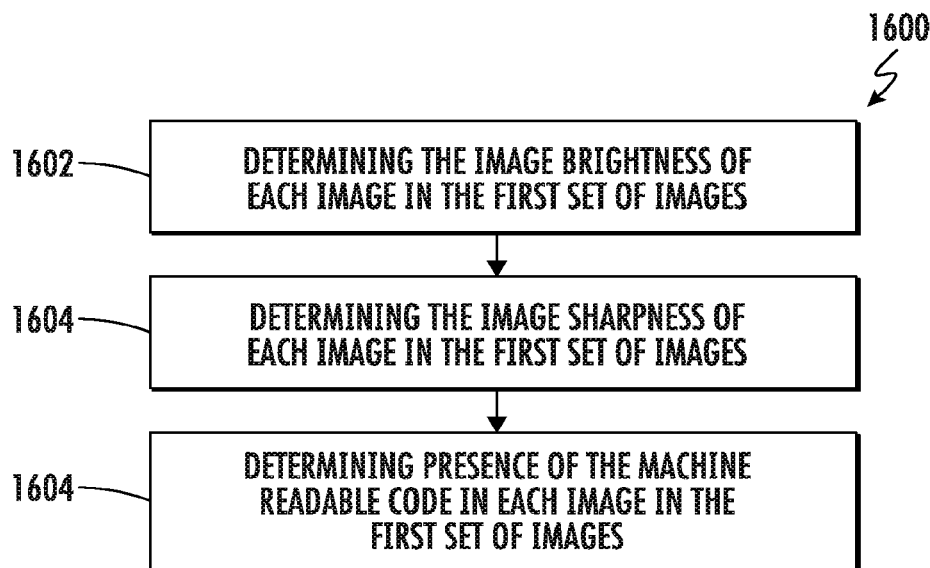
FIG. 16 illustrates a flowchart of a method for determining the one or more image parameters associated with the image, according to one or more embodiments described herein.

FIG. 16 illustrates a flowchart 1600 of a method for determining the one or more image parameters associated with the image, according to one or more embodiments described herein.

At step 1602, the imaging device 100 includes means such as, the control unit 116, the processor 202, the image processing unit 210, and/or the like, for determining the image brightness of each image in the first set of images. In an example embodiment, the image processing unit 210 may be configured to determine the image brightness based pixel values associated with the pixels in the image. In some examples, the pixel values of a pixel in the image is represented as a combination of the values of Red (R) color component, Green (G) color component, Blue (B) color component. Accordingly, the image processing unit 210 may determine the brightness of the pixel as combination of the R component, G component, and B component. For example, the image processing unit 210 may determine the brightness of the pixel by utilizing the following formula:

$$Y = 0.299R + 0.587G + 0.114B \qquad (1)$$

Where Y corresponds to measure of the brightness of the pixel.

Similarly, the image processing unit 210 may be configured to determine the brightness of each pixel in the image. Thereafter, in some examples, the image processing unit 210 may consider the image brightness as the average of the brightness of the pixels in the image. In another implementation, the image processing unit 210 may consider the image brightness as the Minima of the brightness of the pixels in the image and/or the Maxima of the brightness of the pixels in the image.

In some examples, the scope of the disclosure is not limited to the determining the brightness of the pixel using the equation 1. In some examples, the pixel values may include the brightness value. In such an embodiment, the pixels in the image may be represented in CMYK (Cyan, Magenta, Yellow, Black) color scheme. The black color value of the pixel may correspond to the luminance value of the pixel.

At step 1604, the imaging device 100 includes means such as, the control unit 116, the processor 202, the image processing unit 210, and/or the like, for determining the image sharpness of each image in the first set of images. To determine the image sharpness, the image processing unit 210 may be configured to computing Fast Fourier Transform (FFT) of the image to determine one or more frequency components in the image. Thereafter, the image processing unit 210 may be configured to categorize each frequency component of the one or more frequency components as high frequency component and low frequency component based on a predetermined frequency threshold. In some examples, if a frequency component of the one or more frequency component is greater than the predetermined frequency threshold, the image processing unit 210 categorizes frequency component is a high frequency component. However, if a frequency component of the one or more frequency component is less than the predetermined frequency threshold, the image processing unit 210 categorizes frequency component is a low frequency component. In some examples, the predetermined frequency threshold may be pre-stored in the memory device 204 during manufacturing of the imaging device 100.

Thereafter, the image processing unit 210 may be configured to determine whether the count of the high frequency components is greater than the count of the low frequency components. If the image processing unit 210 determines that the count of the high frequency components is greater than the count of the low frequency components, the image processing unit 210 may be configured to determine that the image is sharp. However, if the image processing unit 210 determines that the count of the low frequency components is greater than the count of the high frequency components, the image processing unit 210 may be configured to determine that the image is blurred. Additionally or alternatively, the image processing unit 210 may be configured to determine the count of the high frequency components as the image sharpness measure.

At step 1606, the imaging device 100 includes means such as, the control unit 116, the processor 202, the image processing unit 210, and/or the like, for determining presence of the machine readable code in each image in the first set of images. In an example embodiment, the image processing unit 210 may utilize one or more known techniques to determine the presence of the machine readable code in each image of the one or more images.

In some examples, the scope of the disclosure is not limited to the methods described in the FIG. 7-15 to be independent. In an example embodiment, the methods described in the FIGS. 7-15 may be interrelated with each other, without departing from the scope of the disclosure, as is described in FIG. 17.

FIG. 17 illustrates a flowchart 1700 of a method for modifying the first duty cycle and the second duty cycle, according to one or more embodiments described herein.

At step 1702, the imaging device 100 includes means such as, the control unit 116, the processor 202, the I/O device interface unit 208, the workflow management unit 216, and/or the like, for modifying the first duty cycle and the second duty cycle at which the switching unit 222 operates the first image sensor 108A and the second image sensor 108B, respectively, based on the metadata associated with the task.

At step 1704, the imaging device 100 includes means such as, the control unit 116, the processor 202, the I/O device interface unit 208, the image processing unit 210, and/or the like, for determining the first quality score and the second quality score of the one or more images (that includes the first set of images and the second set of images) captured by the first image sensor 108A and the second image sensor 108B, as is described in the step 1502 and 1504. In some examples, the one or more images (that includes the first set of images and the second set of images) may be captured by the first image sensor 108A and the second image sensor 108B at the modified first duty cycle and the modified second duty cycle. Thereafter, the image processing unit 210 may be configured to repeat the steps 1506 and 1510 to determine which of the first quality score (determined for the images in the first set of images) or the second quality score (determined for the images in the second set of images) is greater.

At step 1706, the imaging device 100 includes means such as, the control unit 116, the processor 202, the I/O device interface unit 208, the image processing unit 210, and/or the like, for determining whether the switching unit 222 increased the duty cycle of the image sensor, at the step 1702, that generated images having better quality score. For example, the switching unit 222 increased the first duty cycle associated with the first image sensor at the step 1702 and at step 1704 the image processing unit 210 determines that the first quality score (determined for the images in the first set of images) is greater than the second quality score (determined for the images in the second set of images). Accordingly, the processor 202 may validate the increase in the first duty cycle of the first image sensor 108A. Thereafter, the processor 202 may be configured to repeat the step 1704. However, if the processor 202 is unable to validate the increase in the first duty cycle of the first image sensor 108A, the processor 202 may be configured to perform the step 1708.

At step 1708, the imaging device 100 includes means such as, the control unit 116, the processor 202, the I/O device interface unit 208, the image processing unit 210, and/or the like, for overriding the modification in the first duty cycle and/or the second duty cycle. Thereafter, the image processing unit 210 may be configured to perform the method described in the flowchart 1500 to modify the first duty cycle and the second duty cycle.

In some examples, those having ordinary skills in the art would appreciate that other permutations and combinations of the methods described in the FIG. 7 through FIG. 15 may be envisioned to validate the modification to the first duty cycle and the second duty cycle of the first image sensor 108A and the second image sensor 108B, respectively. For instance, instead of using the first quality score and the second quality score to validate the modification of the first duty cycle and the second duty cycle, the processor 202 may utilize the orientation of the imaging device 100 (as described in FIG. 12) to validate the modification of the first duty cycle and the second duty cycle. In another example, the processor 202 may utilize the operating distance of the imaging device 100 (as described in the FIGS. 9 and 11) to validate the modification of the first duty cycle and the second duty cycle.

In an example embodiment, in response to the modifying the first duty cycle and the second duty cycle, the data logging unit 218 may create or update historical data. Additionally or alternatively, the data logging unit 218 may be configured to create or update the historical data in response to successful decoding the machine readable code. Creating the historical data is further described in conjunction with FIG. 18.

FIG. 18 illustrates a flowchart 1800 of a method for creating or updating the historical data, according to one or more embodiments described herein.

At step 1802, the imaging device 100 includes means such as, the control unit 116, the processor 202, the data logging unit 218, and/or the like, for creating a data record in response to the successful decoding of the machine readable code. In an example embodiment, the data record may include the metadata associated with the task that was performed by the operator (which resulted in successful decoding of the machine readable code), the value of the first duty cycle, and/or the value of the second duty cycle. In some examples, the content of the data record may be dependent on the method used to modify the first duty cycle and the second duty cycle, as is described above in FIGS. 7-16. For instance, additionally or alternatively, the data record may include the first orientation of the imaging device 100, the operating distance of the imaging device 100, the first quality score, and the second quality score.

In an example embodiment, additionally or alternatively, the data logging unit 218 may be configured to create the data record in response to modifying the first duty cycle and the second duty cycle, irrespective of whether the image processing unit 210 successfully decodes the machine readable code.

At step 1804, the imaging device 100 includes means such as, the control unit 116, the processor 202, the data logging unit 218, and/or the like, for updating or creating the historical data. In an example embodiment, the data logging unit 218 may be configured to consider the data record as the historical data. If the historical data exists, the data logging unit 218 may be configured to append the data record to the existing historical data. Following table illustrates an example historical data:

TABLE 3

Example historical data

| Tasks | Type of task | Location of task | First duty cycle | Second duty cycle | Operating distance | Image sensor | Orientation | Successful decoding |
|---|---|---|---|---|---|---|---|---|
| Task-1 | Picking task | Aisle - 2. Tray - 5 | 75% | 25% | 5 meters | First image sensor 108A | Pitch: 200 Yaw: 0 Roll: 0 | Yes |
| Task-2 | Placing task | Aisle - 1. Tray - 4 | 35% | 65% | 0.5 meter | Second image sensor 108B | Pitch 200 Yaw 45 Roll: 0 | No |
| Task-3 | Picking task | Aisle - 3. Tray - 6 | 45% | 55% | 0.5 meter | Second image sensor 108B | Pitch 200 Yaw −45 Roll 0 | No |

At step 1806, the imaging device 100 includes means such as, the control unit 116, the processor 202, the data logging unit 218, and/or the like, for training the machine learning (ML) model 220 based on the historical data. In an example embodiment, the processor 202 may utilize one or more known techniques to train the ML model. Some examples of the ML model may include, but not limited to, Tensor flow, neural network, regression mode, Bayes theorem, and/or the like.

Figure 19:
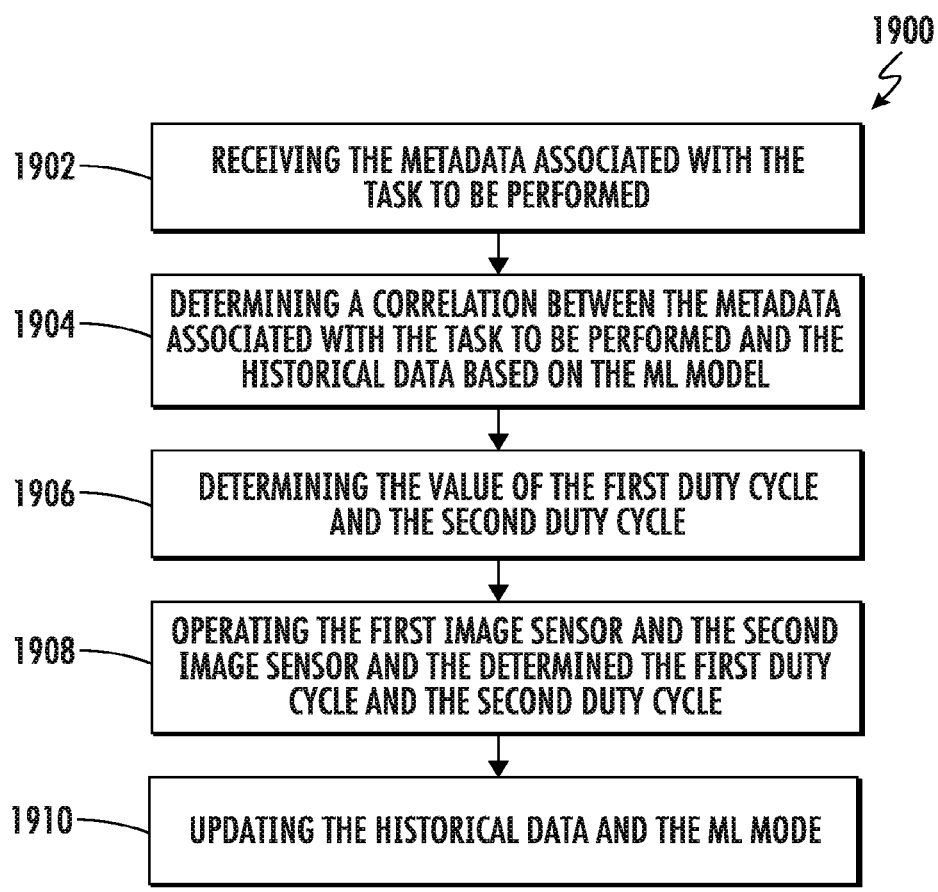
FIG. 19 illustrates another flowchart of a method for updating the first duty cycle and the second duty cycle, according to one or more embodiments described herein.

Using the ML model, the processor 202 may be configured to predict the first duty cycle and the second duty cycle at which the first image sensor 108A and the second image sensor 108B are to be operated, as is further described in FIG. 19.

FIG. 19 illustrates a flowchart 1900 of a method for modifying the first duty cycle and the second duty cycle, according to one or more embodiments described herein.

At step 1902, the imaging device 100 includes means such as, the control unit 116, the processor 202, the data logging unit 218, the ML model 220, and/or the like, for receiving the metadata associated with the task to be performed.

At step 1904, the imaging device 100 includes means such as, the control unit 116, the processor 202, the data logging unit 218, the ML model 220, and/or the like, for determining a correlation between the metadata associated with the task to be performed and the historical data based on the ML model. For example, the metadata associated with the task to be performed includes Task-1: Picking task: Aisle—2. Tray—4. Based on the correlation of the metadata and the historical data (where the processor 202 may determine the correlation by using the ML model 220), the processor 202 may determine that the task is similar to task-1 (e.g., based on the location where that task is to be performed).

At step 1906, the imaging device 100 includes means such as, the control unit 116, the processor 202, the data logging unit 218, the ML model 220, the switching unit 222, and/or the like, for determining the value of the first duty cycle and the values of the second duty cycle at which the first image sensor 108A and the second image sensor 108B are to be operated, using the ML model 220. For instance, since the task is similar to the task-1, the processor 202 may determine that the first duty cycle as 75% and the second duty cycle as 25%.

At step 1908, the imaging device 100 includes means such as, the control unit 116, the processor 202, the data logging unit 218, the ML model 220, the switching unit 222, and/or the like, for operating the first image sensor 108A and the second image sensor 108B at the determined the first duty cycle (75%) and the second duty cycle (25%). In some examples, the scope of the disclosure is not limited operating the first image sensor 108A and the second image sensor 108B at the determined first duty cycle and the second duty cycle. In some examples, the switching unit 222 may be configured to consider the determined first duty cycle and the determined second duty cycle as an initial setting for the first image sensor 108A and the second image sensor 108B. The switching unit 222 may be configured to further optimize the determined first duty cycle and the determined second duty cycle using the methods described in the FIGS. 7-18. For example, the image processing unit 210 and the switching unit 222 may further optimize the first duty cycle and the second duty cycle based on the first quality score and the second quality score determined for the first set of images (captured by the first image sensor 108A) and the second set of images (captured by the second image sensor 108B), as is described above in FIG. 17. Similarly, other methods may be used to further optimize the first duty cycle and the second duty cycle.

At step 1910, the imaging device 100 includes means such as, the control unit 116, the processor 202, the data logging unit 218, the ML model 220, the data logging unit 218, and/or the like, for updating the historical data and the ML model 220.

In an example embodiment, the processor 202 may be configured transmit the ML model 220 to the central server, which may further transmit the ML model to the other imaging devices in the work environment. Such process allows regular updating of the ML model 220 across the various devices operating in the work environment.

In some examples, the scope of the disclosure is not limited to creating a single ML model 220. In an example embodiment, the processor 202 may be configured to create one or more ML models. For example, the processor 202 may be configured to create a common ML model and a user specific ML model. In such an embodiment, the data logging unit 218 may be configured to segregate the historical data into user-specific historical data and common historical data. Such segregation may be based on a hypothesis that every operator has a specific way of operating the imaging device 100. For example, every operator may be configured to hold the imaging device 100 in a specific manner to perform the operation. Accordingly, the orientation of the imaging device 100, while a first operator performs a task using the imaging device 100, may be different than the orientation of the imaging device 100, while a second operator performs the task using the imaging device 100. Additionally or alternatively, the data logging unit 218 may consider the operating distance as the operator specific data. Accordingly, in some examples, the data logging unit 218 may be configured to create following user-specific historical data:

TABLE 4

| User specific historical data | | | | |
|---|---|---|---|---|
| Operating distance | Orientation | First duty cycle | Second duty cycle | Decoding result |
| 5 meters | Pitch: 200 Yaw: 0 Roll: 0 | 75% | 25% | Yes |
| 0.5 meter | Pitch 200 Yaw 45 Roll: 0 | 35% | 65% | No |
| 0.5 meter | Pitch 200 Yaw −45 Roll 0 | 45% | 55% | No |

Similarly, the data logging unit 218 may be configured to create the common historical data as is illustrated below:

TABLE 4

| Common historical data | | | | | |
|---|---|---|---|---|---|
| Tasks | Type of task | Location of task | First duty cycle | Second duty cycle | Successful decoding |
| Task-1 | Picking task | Aisle - 2. Tray - 5 | 75% | 25% | Yes |
| Task-2 | Placing task | Aisle - 1. Tray - 4 | 35% | 65% | No |
| Task-3 | Picking task | Aisle - 3. Tray - 6 | 45% | 55% | No |

In an example embodiment, thereafter, the processor 202 may be configured to create a common ML model and a user-specific ML model using the common historical data and user-specific historical data, respectively. Subsequently, the processor 202 may be configured to predict the first duty cycle and the second duty cycle using the common historical data and user-specific historical data.

Figure 20:
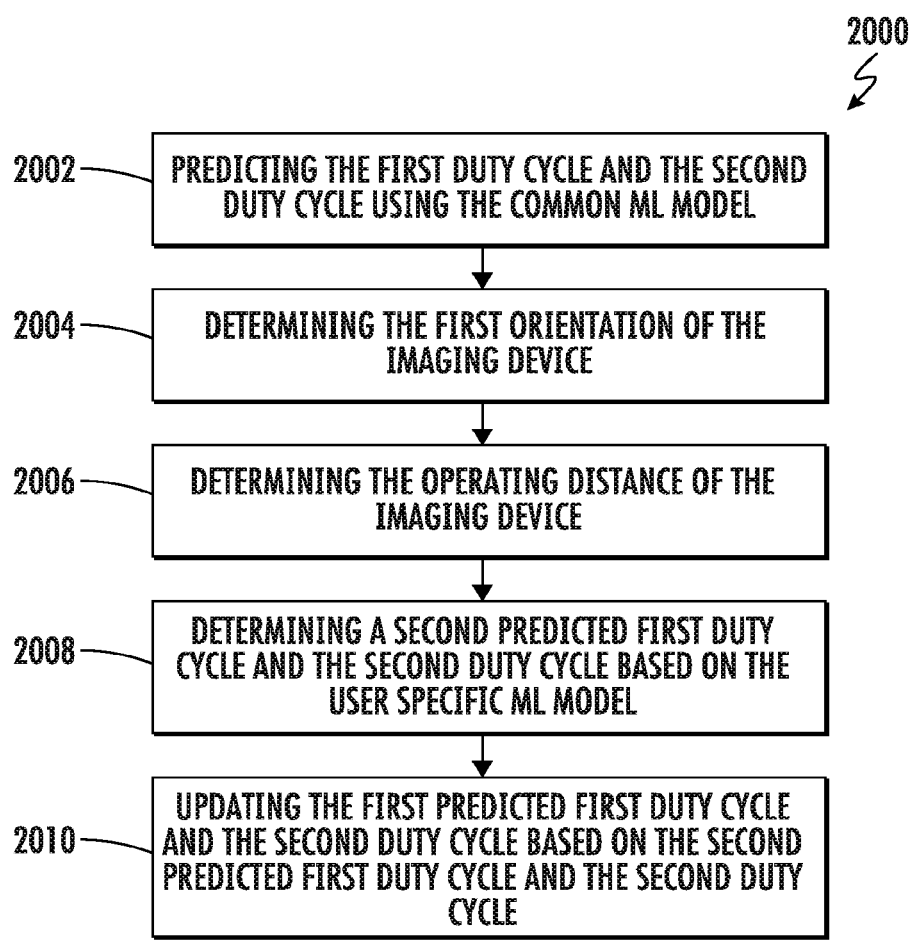
FIG. 20 illustrates another flowchart 2000 of a method for updating the first duty cycle and the second duty cycle, according to one or more embodiments described herein.

FIG. 20 illustrates another flowchart 2000 of a method for updating the first duty cycle and the second duty cycle, according to one or more embodiments described herein.

At step 2002, the imaging device 100 includes means such as, the control unit 116, the processor 202, and/or the like, for predicting the first duty cycle and the second duty cycle using the common ML model, as is described in flowchart 1900.

At step 2004, the imaging device 100 includes means such as, the control unit 116, the processor 202, the orientation determination unit 212, and/or the like, for determining the first orientation of the imaging device 100, as is described in FIG. 12.

At step 2006, the imaging device 100 includes means such as, the control unit 116, the processor 202, the operating distance determination unit 214, and/or the like, for determining the operating distance of the imaging device 100, as described in the FIGS. 9 and 11.

At step 2008, the imaging device 100 includes means such as, the control unit 116, the processor 202, the operating distance determination unit 214, and/or the like, for determining a second predicted first duty cycle and the second duty cycle based on the user specific ML model, the first orientation of the imaging device 100, and the operating distance of the imaging device 100.

At step 2010, the imaging device 100 includes means such as, the control unit 116, the processor 202, the operating distance determination unit 214, and/or the like, for updating the predicted first duty cycle and the predicted second duty cycle based on the second predicted first duty cycle and the second predicted second duty cycle. Accordingly, the switching unit 222 may be configured to modify the first duty cycle and the second duty cycle.

In some embodiments, it should be appreciated that embodiments may decrease and/or otherwise modify the first duty cycle and/or second duty cycle in lieu of increasing such duty cycles. For example, embodiments may decrease the duty cycle for an image sensor determined not appropriate for a particular task. Additionally or alternatively, such embodiments may similarly perform the opposite determinations of those described herein, for example to determine less appropriate image sensors (e.g., those capturing less sharp images) to modify the duty cycle for such image sensors, such as by decreasing the duty cycle.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor readable media. These instructions may be embodied by one or more processor executable software modules that reside on the one or more non-transitory computer-readable or processor-readable storage media. Non-transitory computer-readable or processor 402-readable storage media may in this regard comprise any storage media that may be accessed by a computer or a processor. By way of example but not limitation, such non-transitory computer-readable or processor readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor readable media. Additionally, any combination of instructions stored on the one or more non-transitory processor readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A imaging device, the imaging device comprising:
a first image sensor;
a second image sensor; and
a processor communicatively coupled to the first image sensor and the second image sensor, wherein the processor is configured to:
activate the first image sensor at a first duty cycle within a first time period;

activate the second image sensor at a second duty cycle within the first time period; and modify at least one of the first duty cycle or the second duty cycle based on metadata associated with an operator of the imaging device.

2. The imaging device of claim 1, wherein the processor is further configured to modify the at least one of the first duty cycle or the second duty cycle based on historical data pertaining to tasks previously performed by the operator operating the imaging device.

3. The imaging device of claim 1, wherein the first image sensor is configured to capture a first set of images within the first time period, wherein the second image sensor is configured to capture a second set of images within the first time period.

4. The imaging device of claim 3, wherein the processor is further configured to:

determine a first quality score for a first image in the first set of images;

determine a second quality score for a second image in the second set of images; and compare the first quality score with the second quality score to determine whether the first image has a better quality than the second image.

5. The imaging device of claim 4, wherein the processor is configured to increase the second duty cycle, in response to determining that the second quality score is greater than the first quality score, and wherein the processor is configured to increase the first duty cycle, in response to determining that the first quality score is greater than the second quality score.

6. The imaging device of claim 4, wherein a quality score of an image is determined based on a measure of image sharpness, a measure of image brightness, and a presence of a machine readable code in an image.

7. The imaging device of claim 1, further comprising an aimer LED that is communicatively coupled to the processor, wherein the processor is configured to activate the aimer LED to project aimer light, wherein the aimer LED is activated during respective activation of the first image sensor and the second image sensor such that at least one first image of a first set of images and at least one second image of a second set of images includes an image of the projected aimer light.

8. The imaging device of claim 7, wherein the processor is configured to:

determine an operating distance of the imager device based on a position of the image of the projected aimer light in the first image and the second image; and modify the at least one of the first duty cycle and the second duty cycle based on the operating distance.

9. The imaging device of claim 1, further comprising a depth sensor communicatively coupled to the processor, wherein the processor is configured to determine an operating distance of the imager device based on a depth signal received from the depth sensor, wherein the processor is configured to modify the at least one of the first duty cycle and the second duty cycle based on the operating distance.

10. The imaging device of claim 1, further comprising one or more inertial sensors communicatively coupled to the processor, wherein the processor is configured to determine an orientation of the imaging device based on an orientation signal received from the one or more inertial sensors, wherein the processor is configured to modify the at least one of the first duty cycle and the second duty cycle based on the orientation of the imaging device.

11. The imaging device of claim 1, wherein to modify at least one of the first duty cycle or the second duty cycle based on at least a workflow associated with the operator of the imaging device, the apparatus is configured to:

receive at least one user input from the operator; and modify the first duty cycle or the second duty cycle to a predetermined value determined based on the at least one user input.

12. A method for operating an imaging device, the method comprising:

activating a first image sensor at a first duty cycle within a first time period;

activating a second image sensor at a second duty cycle within the first time period; and modifying at least one of the first duty cycle or the second duty cycle based on metadata associated with an operator of the imaging device.

13. The method of claim 12, further comprising modifying the at least one of the first duty cycle or the second duty cycle based on historical data pertaining to tasks previously performed by the operator operating the imaging device.

14. The method of claim 12, wherein the first image sensor is configured to capture a first set of images within the first time period, wherein the second image sensor is configured to capture a second set of images within the first time period.

15. The method of claim 14, further comprising:

determining a first quality score for a first image in the first set of images;

determining a second quality score for a second image in the second set of images; and comparing the first quality score with the second quality score to determine whether the first image has a better quality than the second image.

16. The method of claim 15, further comprising increasing the second duty cycle, in response to determining that the second quality score is greater than the first quality score, and increasing the first duty cycle, in response to determining that the first quality score is greater than the second quality score.

17. The method of claim 15, wherein a quality score of an image is determined based on a measure of image sharpness, a measure of image brightness, and a presence of a machine readable code in an image.

18. The method of claim 12, further comprising activating an aimer LED to project aimer light during respective activation of the first image sensor and the second image sensor such that at least one first image of a first set of images and at least one second image of a second set of images includes an image of the projected aimer light.

19. The method of claim 18, further comprising:

determining an operating distance of the imager device based on a position of the image of the projected aimer light in the first image and the second image; and modifying the at least one of the first duty cycle and the second duty cycle based on the operating distance.

20. A method for operating an imaging device, the method comprising:

activating a first image sensor at a first duty cycle within a first time period;

in response to activation of the first image sensor, activating a first illuminator source;

activating a second image sensor at a second duty cycle within the first time period;

in response to activation of the second image sensor, activating a second illuminator source; and modifying at least one of the first duty cycle or the second duty cycle based on metadata associated with a task of the imaging device.

* * * * *